United States Patent
Singh

(10) Patent No.: US 11,368,373 B2
(45) Date of Patent: Jun. 21, 2022

(54) INVOKING MICROAPP ACTIONS FROM USER APPLICATIONS

(71) Applicant: Citrix Systems, Inc., Fort Lauderdale, FL (US)

(72) Inventor: Manbinder Pal Singh, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/902,867

(22) Filed: Jun. 16, 2020

(65) Prior Publication Data

US 2021/0392053 A1    Dec. 16, 2021

(51) Int. Cl.
*H04L 41/22* (2022.01)
*G06F 9/451* (2018.01)
(Continued)

(52) U.S. Cl.
CPC ............ *H04L 41/22* (2013.01); *G06F 3/0482* (2013.01); *G06F 3/04842* (2013.01); *G06F 9/445* (2013.01); *G06F 9/451* (2018.02); *H04L 12/66* (2013.01); *H04L 41/0803* (2013.01); *H04L 67/141* (2013.01)

(58) Field of Classification Search
CPC ....... H04L 41/22; H04L 67/141; H04L 12/66; H04L 41/0803; G06F 3/04842; G06F 9/451; G06F 9/445; G06F 3/0482
See application file for complete search history.

(56) References Cited

U.S. PATENT DOCUMENTS 5,805,167 A * 9/1998 van Cruyningen ... G06F 3/0482
                                                   715/808
10,296,298 B1 * 5/2019 Mercilie .................. G06F 8/315
(Continued)

FOREIGN PATENT DOCUMENTS

CN    109359449 A  *  2/2019
CN    110795486 A  *  2/2020

OTHER PUBLICATIONS

Hsu, C. "Citrix Workspace intelligence: Empower your employees." Jun. 13, 2019. https://web.archive.org/web/20190613121912/https://www.citrix.com/blogs/2019/05/21/citrix-workspace-intelligence-empower-your-employees/ (Year: 2019).*

(Continued)

*Primary Examiner* — Kieu D Vu
*Assistant Examiner* — Alvaro R Calderon, IV
(74) *Attorney, Agent, or Firm* — Pierce Atwood LLP

(57) ABSTRACT

In one disclosed method, a first application accessed by a client device receives an indicator of an action that a second application is configured to take with respect to a third application. The client device accesses a fourth application and presents, based at least in part on the indicator received by the first application, a user interface element for the fourth application. Based at least in part on detecting selection of the user interface element, the client device presents a user interface configured to cause the second application to take the action with respect to the third application in response to a user input. The client device detects the user input to the user interface and causes, based at least in part on the user input, the second application to perform the action with respect to the third application.

20 Claims, 12 Drawing Sheets

(51) Int. Cl.
  *G06F 3/0482*   (2013.01)
  *G06F 3/04842*  (2022.01)
  *G06F 9/445*    (2018.01)
  *H04L 12/66*    (2006.01)
  *H04L 41/0803*  (2022.01)
  *H04L 67/141*   (2022.01)

(56) References Cited

U.S. PATENT DOCUMENTS

| | | | | |
|---|---|---|---|---|
| 10,296,309 | B1* | 5/2019 | Mercilie | G06F 8/30 |
| 2002/0105548 | A1* | 8/2002 | Hayton | G06F 9/451 |
| | | | | 715/764 |
| 2003/0061323 | A1* | 3/2003 | East | H04L 41/22 |
| | | | | 709/223 |
| 2003/0070004 | A1* | 4/2003 | Mukundan | G06F 9/548 |
| | | | | 719/330 |
| 2005/0039141 | A1* | 2/2005 | Burke | G06F 16/957 |
| | | | | 715/810 |
| 2005/0091670 | A1* | 4/2005 | Karatal | G06F 9/451 |
| | | | | 719/328 |
| 2006/0047956 | A1* | 3/2006 | Calvin | G06F 21/6218 |
| | | | | 713/165 |
| 2006/0184898 | A1* | 8/2006 | Kern | G06F 3/04817 |
| | | | | 715/810 |
| 2006/0274086 | A1* | 12/2006 | Forstall | G06F 16/958 |
| | | | | 345/629 |
| 2007/0198949 | A1* | 8/2007 | Rummel | G06F 3/0482 |
| | | | | 715/810 |
| 2008/0055273 | A1* | 3/2008 | Forstall | G06F 3/04883 |
| | | | | 345/173 |
| 2008/0222569 | A1* | 9/2008 | Champion | G06F 3/0482 |
| | | | | 715/834 |
| 2009/0070404 | A1* | 3/2009 | Mazzaferri | G06F 3/0484 |
| | | | | 709/202 |
| 2009/0070687 | A1* | 3/2009 | Mazzaferri | G06F 9/542 |
| | | | | 715/751 |
| 2009/0276771 | A1* | 11/2009 | Nickolov | H04L 67/1014 |
| | | | | 717/177 |
| 2010/0146269 | A1* | 6/2010 | Baskaran | G06F 21/10 |
| | | | | 713/165 |
| 2011/0137991 | A1* | 6/2011 | Russell | G06Q 10/06 |
| | | | | 709/204 |
| 2011/0276908 | A1* | 11/2011 | O'Riordan | G06F 8/34 |
| | | | | 715/763 |
| 2011/0277027 | A1* | 11/2011 | Hayton | H04L 63/0815 |
| | | | | 726/8 |
| 2012/0054625 | A1* | 3/2012 | Pugh | H04L 63/0815 |
| | | | | 715/736 |
| 2012/0089931 | A1* | 4/2012 | Steinhauer | G06F 9/451 |
| | | | | 715/764 |
| 2012/0129503 | A1* | 5/2012 | Lindeman | H04W 12/37 |
| | | | | 455/414.1 |
| 2012/0216125 | A1* | 8/2012 | Pierce | G06Q 10/103 |
| | | | | 715/744 |
| 2012/0260202 | A1* | 10/2012 | Jiang | G06F 3/04817 |
| | | | | 715/765 |
| 2013/0055166 | A1* | 2/2013 | Stinger | G06F 3/0482 |
| | | | | 715/853 |
| 2013/0297700 | A1* | 11/2013 | Hayton | G06Q 10/10 |
| | | | | 709/204 |
| 2014/0013234 | A1* | 1/2014 | Beveridge | G06F 3/0488 |
| | | | | 715/740 |
| 2014/0289674 | A1* | 9/2014 | Jin | G06F 9/542 |
| | | | | 715/810 |
| 2014/0304326 | A1* | 10/2014 | Wesley | H04L 67/10 |
| | | | | 709/203 |
| 2014/0344738 | A1* | 11/2014 | Lai | G06F 9/451 |
| | | | | 715/769 |
| 2015/0032688 | A1* | 1/2015 | Dayon | G06F 16/951 |
| | | | | 707/609 |
| 2015/0082212 | A1 | 3/2015 | Sharda | |
| 2015/0082371 | A1* | 3/2015 | DeWeese | G06F 21/62 |
| | | | | 726/1 |
| 2015/0113446 | A1* | 4/2015 | Penha | G06F 3/0484 |
| | | | | 715/753 |
| 2015/0161277 | A1* | 6/2015 | Heller | G06F 9/44526 |
| | | | | 715/229 |
| 2015/0212667 | A1* | 7/2015 | Holt | G06F 3/04842 |
| | | | | 345/173 |
| 2015/0319144 | A1* | 11/2015 | Barton | G06F 9/485 |
| | | | | 713/168 |
| 2016/0164810 | A1 | 6/2016 | Wolz et al. | |
| 2016/0259497 | A1* | 9/2016 | Foss | G06F 3/0488 |
| 2017/0359462 | A1* | 12/2017 | Harris | G06F 3/0481 |
| 2019/0018717 | A1* | 1/2019 | Feijoo | H04L 67/2823 |
| 2019/0108251 | A1* | 4/2019 | Yared | G06F 16/2379 |
| 2019/0253499 | A1* | 8/2019 | Ferrara | H04L 51/046 |
| 2019/0391825 | A1 | 12/2019 | Jann et al. | |
| 2019/0394255 | A1* | 12/2019 | Kolesnikov | G06F 16/954 |
| 2020/0097612 | A1* | 3/2020 | Borkar | H04L 67/02 |
| 2020/0097614 | A1* | 3/2020 | Borkar | G06F 16/904 |
| 2020/0099738 | A1 | 3/2020 | Borkar et al. | |
| 2020/0226615 | A1* | 7/2020 | Gaur | G06F 3/0482 |
| 2020/0233554 | A1* | 7/2020 | Li | G06F 3/0482 |

OTHER PUBLICATIONS

Sapho. "Sapho." 2017. https://d2uars7xkdmztq.cloudfront.net/app_resources/12835/documentation/30443_en.pdf (Year: 2017).*

Citrix. "What's new with Citrix Workspace—A year in review." Jun. 12, 2019. https://www.citrix.com/blogs/2019/06/06/whats-new-with-citrix-workspace-a-year-in-review/ (Year: 2019).*

Citrix. "Microapps." (Accessed Mar. 17, 2021, with datestamps dating back to at least Feb. 2020). https://docs.citrix.com/en-us/citrix-microapps/microapps.pdf (Year: 2021).*

Berger, J. "Citrix Workspace platform." May 5, 2019. https://web.archive.org/web/20190505105351/https://docs.citrix.com/en-us/citrix-cloud/workspace-platform.html (Year: 2019).*

Le Strat, D. "Citrix acquired Sapho. Now what?" Apr. 2, 2019. https://web.archive.org/web/20190402022817/https://www.citrix.com/blogs/2019/02/11/citrix-acquired-sapho-now-what/ (Year: 2019).*

Le Strat et al. "Unleashing Productivity and Redefining Employee Experience." May 2, 2019. https://web.archive.org/web/20190502171727/https://www.citrix.com/blogs/2018/11/15/citrix-acquires-sapho/ (Year: 2019).*

Ruiz, A. "Citrix Workspace Microapps Service." Mar. 6, 2020. https://web.archive.org/web/20200306132843/https://docs.citrix.com/en-us/tech-zone/learn/tech-briefs/workspace-microapps.html (Year: 2020).*

International Search Report and Written Opinion dated Oct. 7, 2021 for International Patent Application No. PCT/US2021/035818.

U.S. Appl. No. 17/343,115, filed Jun. 9, 2021.

U.S. Appl. No. 17/516,868, filed Nov. 2, 2021.

* cited by examiner

INVOKING MICROAPP ACTIONS FROM USER APPLICATIONS

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method comprises receiving, by a first application accessed by a client device, a first indicator of a first action that a second application is configured to take with respect to a third application. The client device accesses a fourth application and presents, based at least in part on the first indicator received by the first application, at least a first user interface element for the fourth application. The client device detects selection of the first user interface element and presents, based at least in part on selection of the first user interface element, a user interface configured to cause the second application to take the first action with respect to the third application in response to a user input. The client device detects the user input to the user interface and causes, based at least in part on the user input, the second application to perform the first action with respect to the third application.

In some disclosed embodiments, method comprises identifying a first indicator of a first action that a first application is configured to take with respect to a second application and accessing, by a client device, a third application. Selection of information presented by the third application is detected and the client device presents, based at least in part on the first indicator, at least a first user interface element for the third application. Selection of the first user interface element is detected and the client device presents, based at least in part on selection of the first user interface element, a user interface configured to cause the first application to take the first action with respect to the second application in response to a user input, the user interface including at least a portion of the selected information. The client device detects the user input to the user interface and causes, based at least in part on the user input, the first application to perform the first action with respect to the second application using the portion of the selected information.

In some disclosed embodiments, a computing system comprises at least one processor, and at least one computer-readable medium encoded with instructions which, when executed by the at least one processor, cause the computing system to receive, by a first application accessed by a client device, a first indicator of a first action that a second application is configured to take with respect to a third application, to access, by the client device, a fourth application, to present, by the client device and based at least in part on the first indicator received by the first application, at least a first user interface element for the fourth application, to detect, by the client device, selection of the first user interface element, to present, by the client device and based at least in part on selection of the first user interface element, a user interface configured to cause the second application to take the first action with respect to the third application in response to a user input, to detect, by the client device, the user input to the user interface, and to cause, by the client device and based at least in part on the user input, the second application to perform the first action with respect to the third application.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

DETAILED DESCRIPTION

Figure 1A:
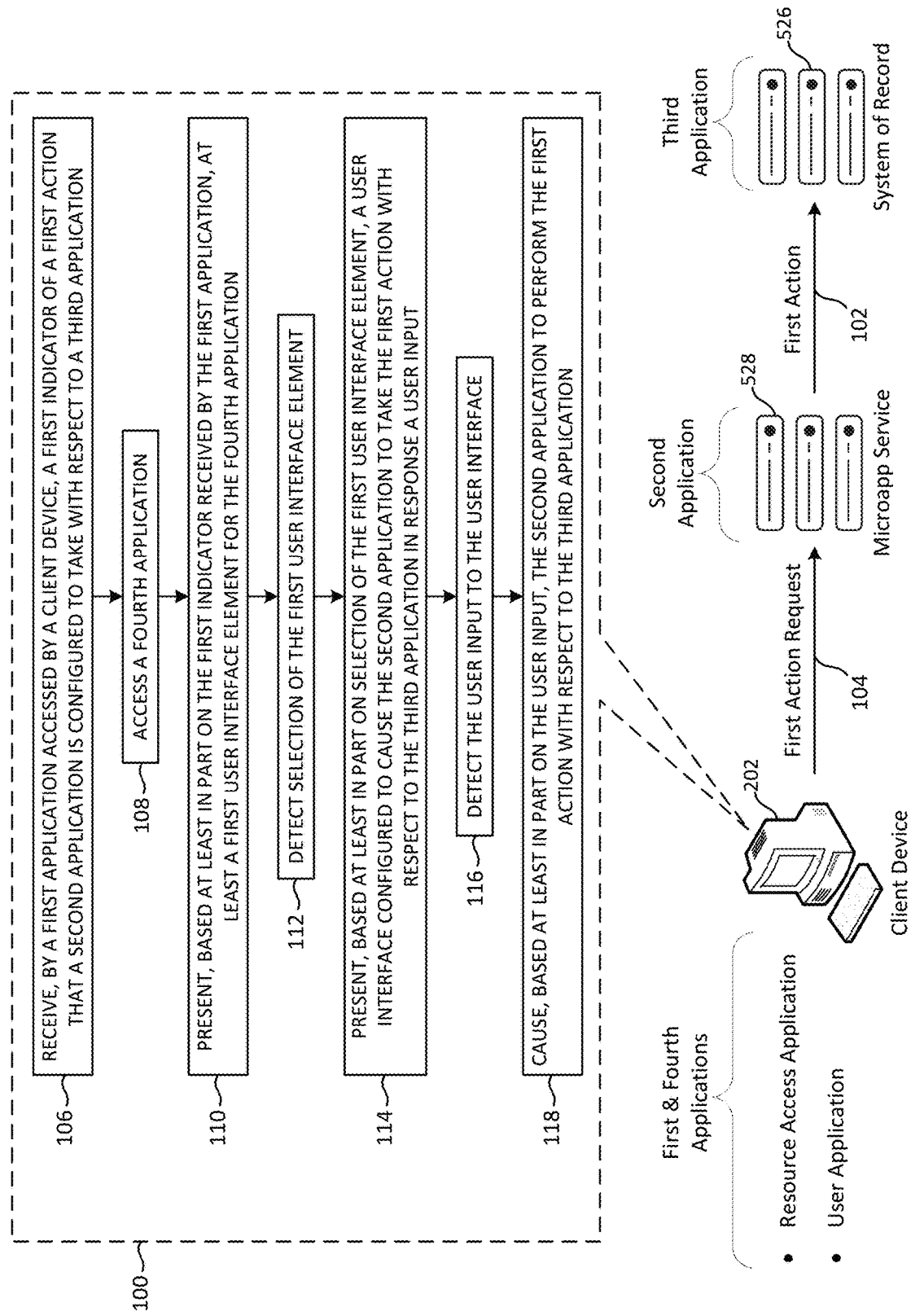
FIG. 1A is provides a high-level overview of a first example implementation of a system for invoking microapp actions from a user application in accordance with some embodiments of the present disclosure.

For purposes of reading the description of the various embodiments below, the following descriptions of the sections of the specification and their respective contents may be helpful:

Section A provides an introduction to example embodiments of a system for invoking microapp actions from user applications;

Section B describes a network environment which may be useful for practicing embodiments described herein;

Section C describes a computing system which may be useful for practicing embodiments described herein;

Section D describes embodiments of systems and methods for delivering shared resources using a cloud computing environment;

Section E describes embodiments of systems and methods for managing and streamlining access by clients to a variety of resources;

Section F provides a more detailed description of example embodiments of invoking microapp actions from user applications that were introduced above in Section A;

Section G describes example implementations of methods, systems/devices, and computer-readable media in accordance with the present disclosure.

A. Introduction to Illustrative Embodiments of Systems for Invoking Microapp Actions from User Applications An example implementation of a multi-resource access system 500 is described below (in Section E) in connection with FIGS. 5A-D. As discussed in connection with FIGS. 5C and 5D, a "microapp" may provide a mechanism for a user of a client device 202 to invoke a particular action with respect to a system of record (e.g., SalesForce, Ariba, Concur, Jira, Trello, RightSignature, etc.), without needing a full launch of the application or to switch context. Microapps may, for example, utilize APIs available within SaaS, web, or home-grown applications to take actions with respect to such applications. As Section E describes (with reference to FIG. 5D), in some existing implementations, microapp actions may be invoked by selecting user interface elements 548 presented within notifications 546 in an activity feed 544, by clicking on a particular notification 546 to access a more detailed user interface for a microapp and selecting a user interface element within that more detailed user interface, by selecting a desired action, e.g., via a drop-down menu accessible using the "action" user-interface element 552, or by selecting a desired action from a list 554 of recently and/or commonly used microapp actions. What all of these mechanisms for invoking microapp actions have in common is that they are all accessed via the user interface presented by the resource access application 522 (shown in FIGS. 5B and 5C).

The inventor has recognized and appreciated that circumstances may arise in which it would be beneficial and/or desirable to invoke certain microapp actions while operating a user application other than the resource access application 522, without needing to switch context to the resource access application 522. For instance, the inventor has contemplated a scenario in which a user operating any of a number of user applications may wish to seamlessly "push" a task to a task management application, such as Jira or Trello, without needing to do a full launch of that task management application and also without needing to switch context to the resource access application 522. Other similar scenarios are also possible where a user operating one application may wish to invoke a microapp to take an action with respect to another application, without needing to launch and switch context to the other application, and also without needing to switch context to the resource access application 522. The inventor has also recognized and appreciated that circumstances may arise in which it may beneficial and/or desirable to select information being presented by a user application (which may be the resource access application 522 or another user application), e.g., by highlighting text, right clicking on an active window, etc., prior to invoking a microapp action, so that the selected information may be used to prepopulate one or more fields prior to submitting the microapp action for processing, e.g., via the microapp service 528.

Offered is a system in which certain microapp actions enumerated to the resource access application 522, e.g., together with various other microapp actions, applications, desktops, file folders, etc., may be "tagged" to indicate to a user interface engine of a launched user application that an additional user interface control is to be made available for the launched application that, when selected, may invoke a particular microapp action. For instance, a user operating a launched Saleforce application may wish to add a new task to a Trello application relating to a newly added sales lead. The user may, for example, be accessing the Salesforce application (via a Software-as-a-Service (SaaS) platform) using an embedded browser of the resource access application 522. An example of such an embedded browser is described below in Section E. A microapp action for Trello may, for example, have been built to allow the creation of a new task within Trello, and that action may have been tagged with one indicator, e.g., "Trello" or "task," to indicate the microapp action relates to a particular system of record, and with another indicator, e.g., "create" to indicate that the action involves the creation of a new task within the Trello application. In other cases, one indicator may signify both a system of record and an action to be taken with respect to that system of record. The embedded browser may include logic that, based on the tag(s) that are applied to the microapp actions that were enumerated for the client device 202, e.g., by the resource feed service 518 upon authenticating to the identity service 516 (as described below in connection with FIG. 5B), may provide one or more special user interface controls that may be accessed from the launched application, e.g., Salesforce. For example, by highlighting text in the launched application and right-clicking, or by right-clicking on an active window, etc., the embedded browser may present one or more user interface elements allowing the user to request that a new task be pushed to Trello. In some implementations, for example, a nested menu may be presented that allows a user to first select a particular system of record, e.g., Trello, and then select a particular action to be taken with respect to that system of record, e.g., "push new task." Levels of such a nested menu may, for example, depend on the tags that are assigned to the microapp actions that were enumerated for the client device 202. Other user interface techniques are also possible and contemplated.

Upon selecting such a special user interface element, an additional user interface for the microapp action may be presented. In some implementations, the embedded browser may request such an additional user interface from the microapp service 528 (shown in FIG. 5C). In some implementations, selected information from the user application, e.g., text that was highlighted when the special user interface element was selected, text of a sentence or paragraph on which the user-right clicked to access the special user interface element, information from a window on which the user right-clicked to access the special user interface element, the uniform resource locator (URL) of the web page that was presented when the special user interface element was selected, etc., may also be sent to the microapp service 528, and the microapp service 528 may use some or all of that information to pre-populate one or more fields of the additional user interface. In other implementations, data to enable the generation and/or presentation of the additional user interface may be sent to the resource access application 522 at the time the accessible resources were initially enumerated for the client device 202, e.g., by the resource feed service 518.

Upon receipt of the additional user interface, the user may populate or edit one or more fields of the additional user interface and then select a user interface element (e.g., a "submit" button) so as to cause the data for the completed fields to be sent, e.g., as a hypertext markup language (HTML) form, to the microapp service 528 for processing. The microapp service 528 may then make a call to the data integration provider service 530 so as to complete the requested action with the system of record (e.g., Trello) using the received data.

In other implementations, rather than using a browser to access the user application from which the microapp action (s) are to be invoked, such a user application may be accessed using another remote access engine of the resource access application 522, such as a high definition experience (HDX) engine of the Citrix Workspace™ family of products. For example, in some implementations the user application may be delivered to a remote access engine of the client device 202 by a virtual delivery agent (VDA) of an application delivery system, such as that provided in the Virtual Apps and Desktops™ systems offered by Citrix Systems, Inc. In such implementations, logic to enable the presentation of the one or more user special interface elements described above may be included within such a remote access engine.

Figure 5A:
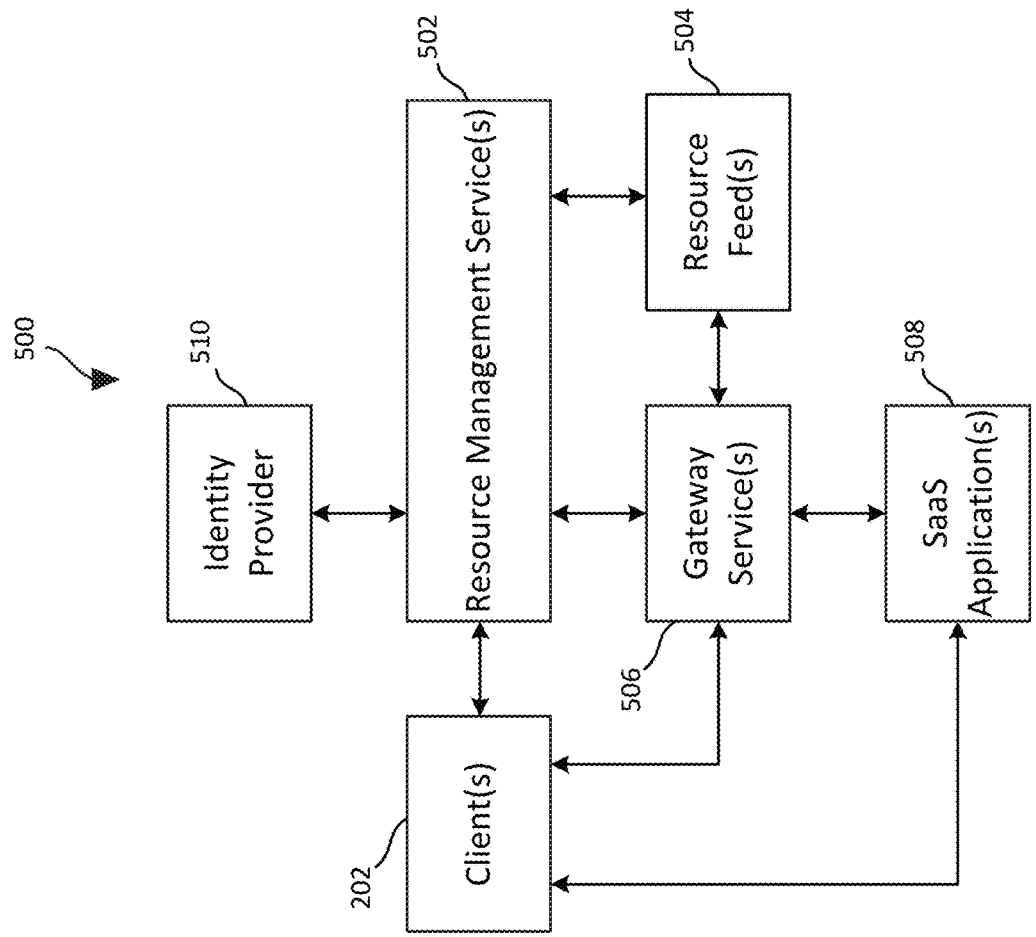
FIG. 5A is a block diagram of an example system in which resource management services may manage and streamline access by clients to resource feeds (via one or more gateway services) and/or software-as-a-service (SaaS) applications.
Figure 5B:
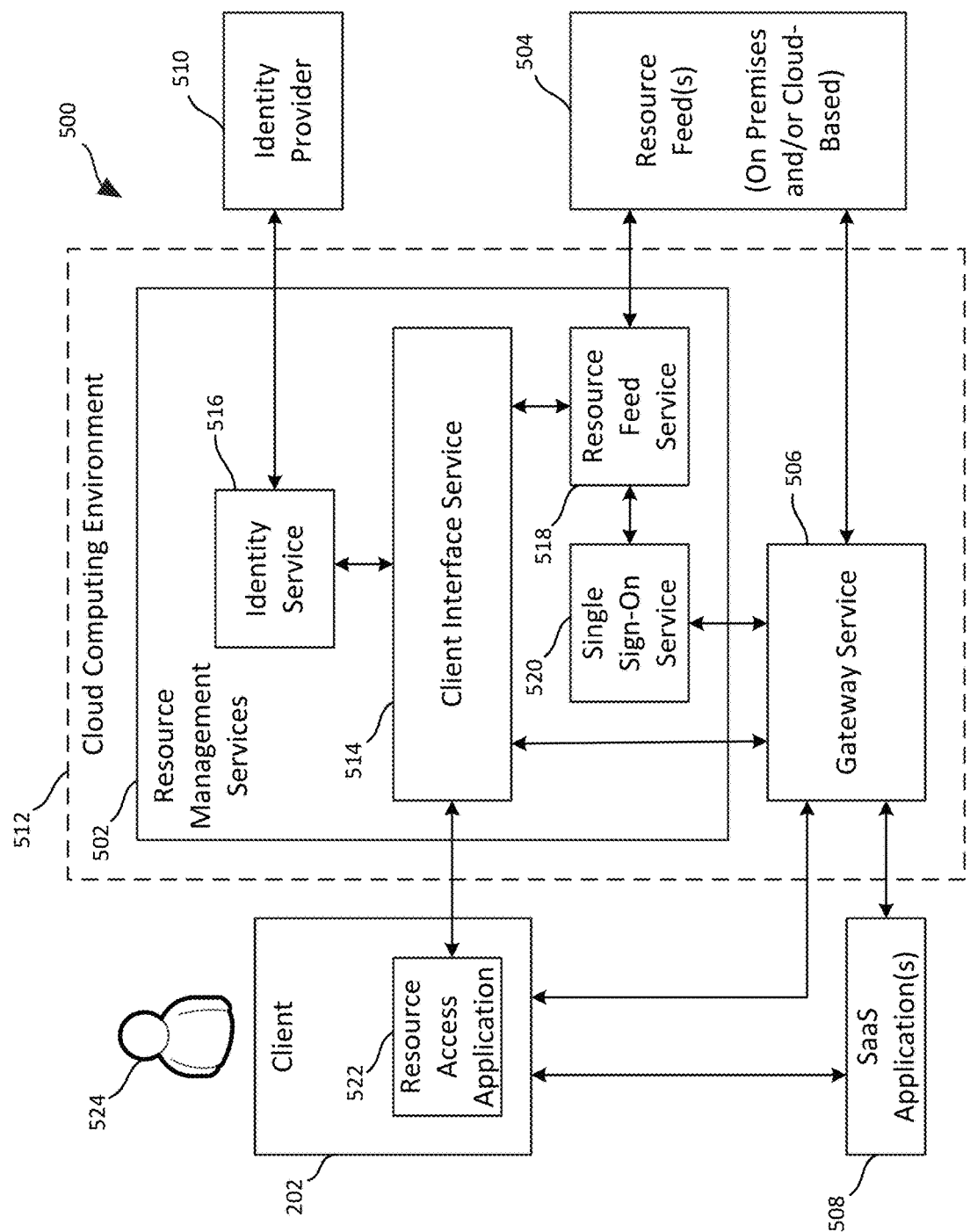
FIG. 5B is a block diagram showing an example implementation of the system shown in FIG. 5A in which various resource management services as well as a gateway service are located within a cloud computing environment.

In still other implementations, the user application from which the microapp action(s) are to be invoked may be accessed in other ways, such as via a gateway connection, such as may be provided by the gateway service 506 shown in FIG. 5B. In such an implementation, logic to enable the presentation of the one or more user special interface elements described above may be inserted in the code for the application that is being delivered to the client device 202, e.g., as Javascript, via the gateway service 506. For example, the gateway service 506 may insert Javascript that causes the one or more special user interface elements to be presented in response to particular user inputs (e.g., right-clicking) based on one or more tags that are assigned to microapp actions. The gateway service 506 may, for example, query the resource access application 522 and/or the resource feed service 518 to identify the tags that have been assigned to microapp actions included among the resources that were enumerated for the client device 202.

In yet other implementations, the one or more user special interface elements may be generated by a plug-in or add-in to the user application from which the microapp action(s) are to be invoked. For example, a plug-in or add-in may be provided for a Microsoft Outlook application that causes the one or more special user interface elements to be presented in response to particular user inputs (e.g., right-clicking) based on one or more tags that are assigned to microapp actions. Such a plug-in or add-in may, for example, query the resource access application 522 to identify the tags that have been assigned to microapp actions included among the resources that were enumerated for the client device 202.

FIG. 1A shows a first example routine 100 that may be performed by a client device 202 in a computing environment in which a second application (e.g., a microapp of the microapp service 528) is configured to take a first action 102 with respect to a third application (e.g., a system of record 526), such as pushing a task to a task management application, in response to a user input that causes a first action request 104 to be sent to the second application. As indicated, the client device 202 may include a first application (e.g., the resource access application 522) that may be used, for example, to access various resources, including a fourth application (e.g., a user application such as Salesforce, Workaday, etc.).

At a step 106 of the routine 100, the first application (e.g., the resource access application 522) may receive a first indicator of the first action that the second application (e.g., a microapp of the microapp service 528) may perform with respect to the third application (e.g., a system of record 526). In some implementations, the first indicator may, for example, include one or more tags that have been assigned to a microapp action that has been enumerated for the client device 202.

At a step 108 of the routine 100, the client device 202 may access a fourth application, such as by selecting one of several user applications that are made accessible by the resource access application 522.

At a step 110 of the routine 100, the client device 202 may present at least a first user interface element for the fourth application based at least in part on the first indicator. For example, in some implementations, the presence of one or more tags assigned to microapp actions may cause the fourth application to present one or more special user interface elements in response to a particular input (e.g., a right-click). Such special user interface elements may, for example, provide the user with an option to invoke a particular microapp action, such as pushing a task to a task management application.

At a step 112 of the routine 100, the client device 202 may detect selection of the first user interface element. For example, in some implementations, based on one or more tags assigned to microapp actions, a menu of available microapp actions may be presented via a user interface of the fourth application, e.g., as a drop-down menu that appears in response to a right-click, and the user may select one of the microapp actions indicated in such a menu.

At a step 114 of the routine 100, the client device 202 may, based at least in part on the selection of the first user interface element (at the step 112), present a user interface that is configured to cause the second application (e.g., a microapp) to take the first action 102 with respect to the third application (e.g., a system of record 526) in response to a user input, such as by sending the first action request 104 to the second application.

At a step 116 of the routine 100, the client device 202 may detect the user input to the user interface. For example, after the user completes and/or edits various fields within the user interface, the user may click on a "submit" button or the like.

At a step 118 of the routine 100, the client device 202 may cause the second application (e.g., a microapp) to perform the first action 102 with respect to the third application, e.g., a system of record 526, based at least part on the detected user input to the user interface. For example, in some implementations, the client device may send the first action request 104 to the second application (e.g., a microapp), and the second application may, in turn, instruct the data integration provider service 530 to cause the first action 102 to be taken with respect to a system of record 526, such as by obtaining appropriate credentials and accessing an API of the system of record 526.

Figure 1B:
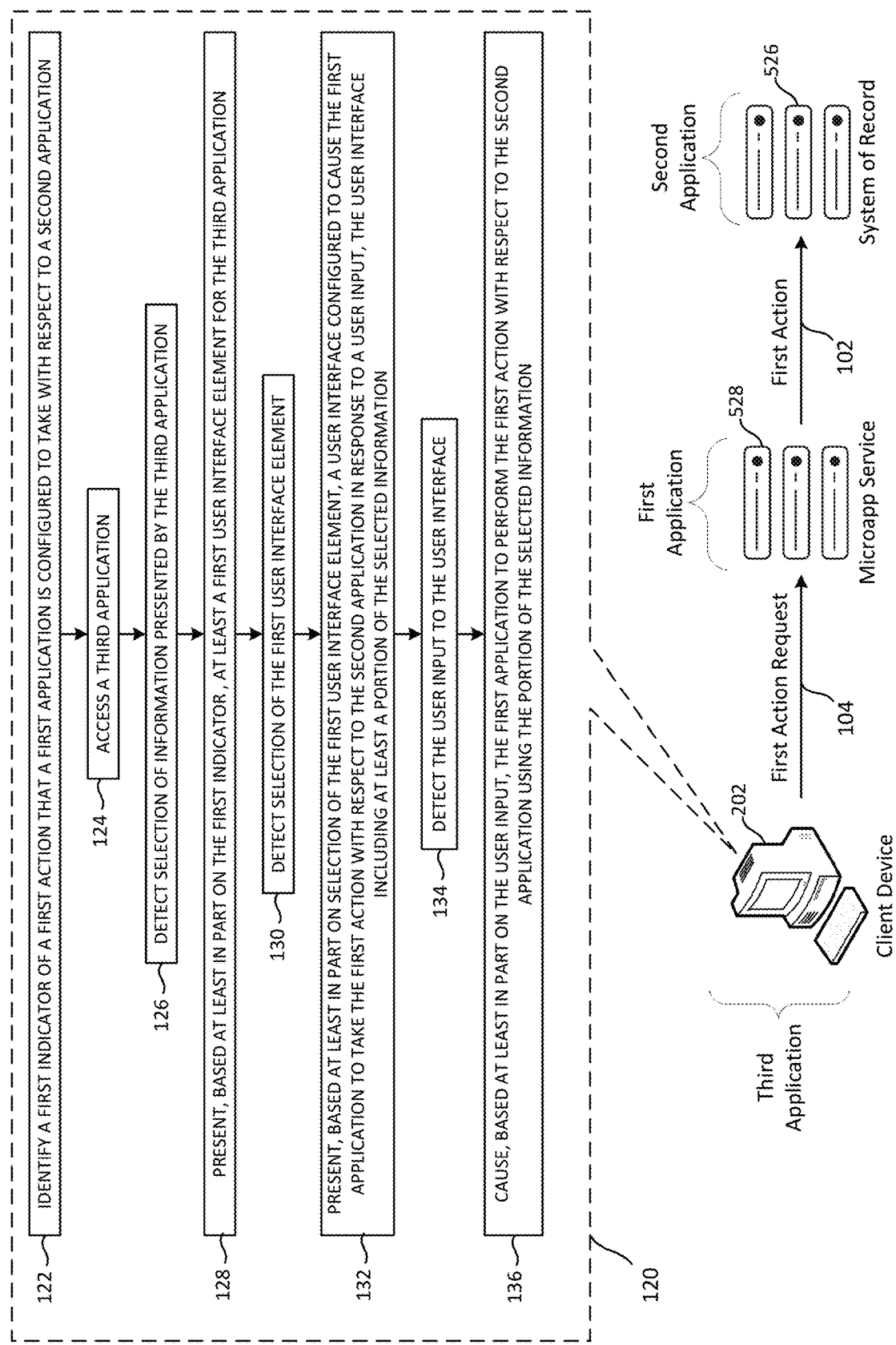
FIG. 1B is provides a high-level overview of a second example implementation of a system for invoking microapp actions from a user application in accordance with some embodiments of the present disclosure.

FIG. 1B shows a first example routine 120 that may be performed by a client device 202 in a computing environment in which a first application (e.g., a microapp of the microapp service 528) is configured to take a first action 102 with respect to a second application (e.g., a system of record 526), such as pushing a task to a task management application, in response to a user input that causes a first action request 104 to be sent to the first application. As indicated, the client device 202 may be configured to access to a third application (e.g., Salesforce, Workaday, etc.).

At a step 122 of the routine 120, a first indicator may be identified, by the client device 202 or otherwise. As shown, the first indicator may indicate the first action that the first application (e.g., a microapp of the microapp service 528) may perform with respect to the second application (e.g., a system of record 526). In some implementations, the first indicator may, for example, include one or more tags that have been assigned to a microapp action that has been enumerated for the client device 202.

Figure 5C:
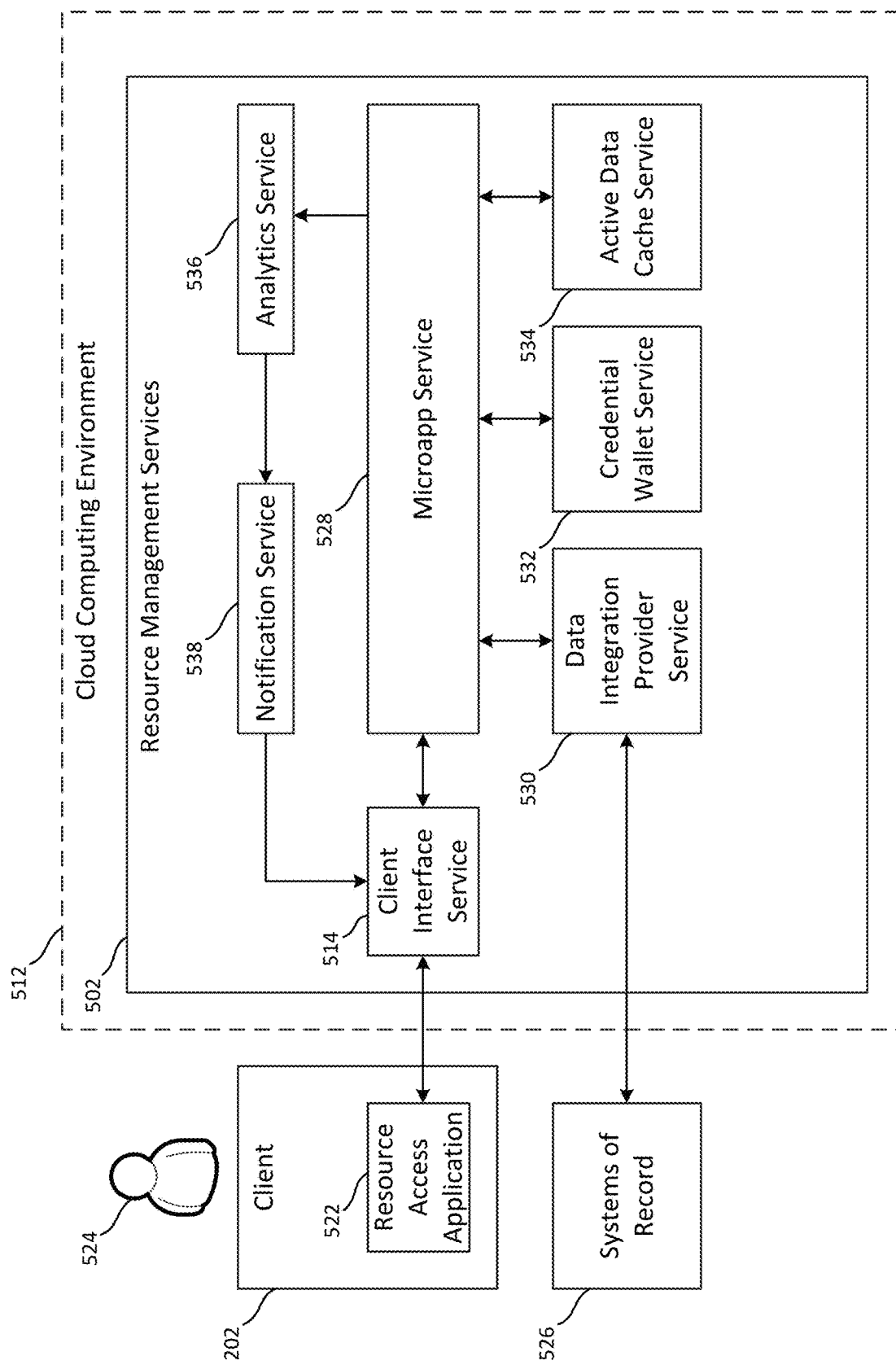
FIG. 5C is a block diagram similar to that shown in FIG. 5B but in which the available resources are represented by a single box labeled "systems of record," and further in which several different services are included among the resource management services.

At a step 124 of the routine 120, the client device 202 may access a third application, such as by selecting one of several user applications that are made accessible by the resource access application 522 (shown in FIGS. 5B and 5C).

At a step 126 of the routine 100, the client device 202, or another computing system running the third application, may detect the selection of information that is being presented by the third application. For example, the client device 202, or another computing system running the third application, may detect the highlighting of a section of text, the highlighting or other selection of an item (e.g., a particular email message, notification or the like) within an active window of the third application, etc., or perhaps even a selection of an entire web page being presented by the third application, e.g., by right-clicking on it.

At a step 128 of the routine 120, the client device 202 may present at least a first user interface element for the third application based at least in part on the first indicator. For example, in some implementations, the presence of one or more tags assigned to microapp actions may cause the third application to present one or more special user interface elements in response to a particular input (e.g., a right-click). Such special user interface elements may, for example, provide the user with an option to invoke a particular microapp action, such as pushing a task to a task management application.

At a step 130 of the routine 120, the client device 202, or another computing system running the third application, may detect selection of the first user interface element. For example, in some implementations, based on one or more tags assigned to microapp actions, a menu of available microapp actions may be presented via a user interface of the third application, e.g., as a drop-down menu that appears in response to a right-click, and the user may select one of the microapp actions indicated in such a menu.

At a step 132 of the routine 120, the client device 202 may, based at least in part on the selection of the first user interface element (at the step 130), present a user interface that is configured to cause the first application (e.g., a microapp) to take the first action 102 with respect to the second application (e.g., a system of record 526) in response to a user input, such as by sending the first action request 104 to the second application. As indicated, the user interface that is so presented may include at least a portion of the information from the third application that was selected at the step 128. In some implementations, for example, the selected information may be processed (by the microapp service 528 or otherwise) to determine information that is to be pre-filled in one or more fields of the user interface before it is presented to the user of the client device 202.

At a step 134 of the routine 120, the client device 202 may detect the user input to the user interface. For example, after the user completes and/or edits various fields within the user interface, the user may click on a "submit" button or the like.

At a step 136 of the routine 120, the client device 202 may cause the first application (e.g., a microapp) to perform the first action 102 with respect to the second application, e.g., a system of record 526, based at least part on the detected user input to the user interface, and using the portion of the information from the third application that was selected at the step 128. For example, in some implementations, the client device may send the first action request 104 to the first application (e.g., a microapp), and the first application may, in turn, instruct the data integration provider service 530 to cause the first action 102 to be taken with respect to a system of record 526, such as by obtaining appropriate credentials and accessing an API of the system of record 526.

Additional details and example implementations of embodiments of the present disclosure are set forth below in Section F, following a description of example systems and network environments in which such embodiments may be deployed.

B. Network Environment

Figure 2:
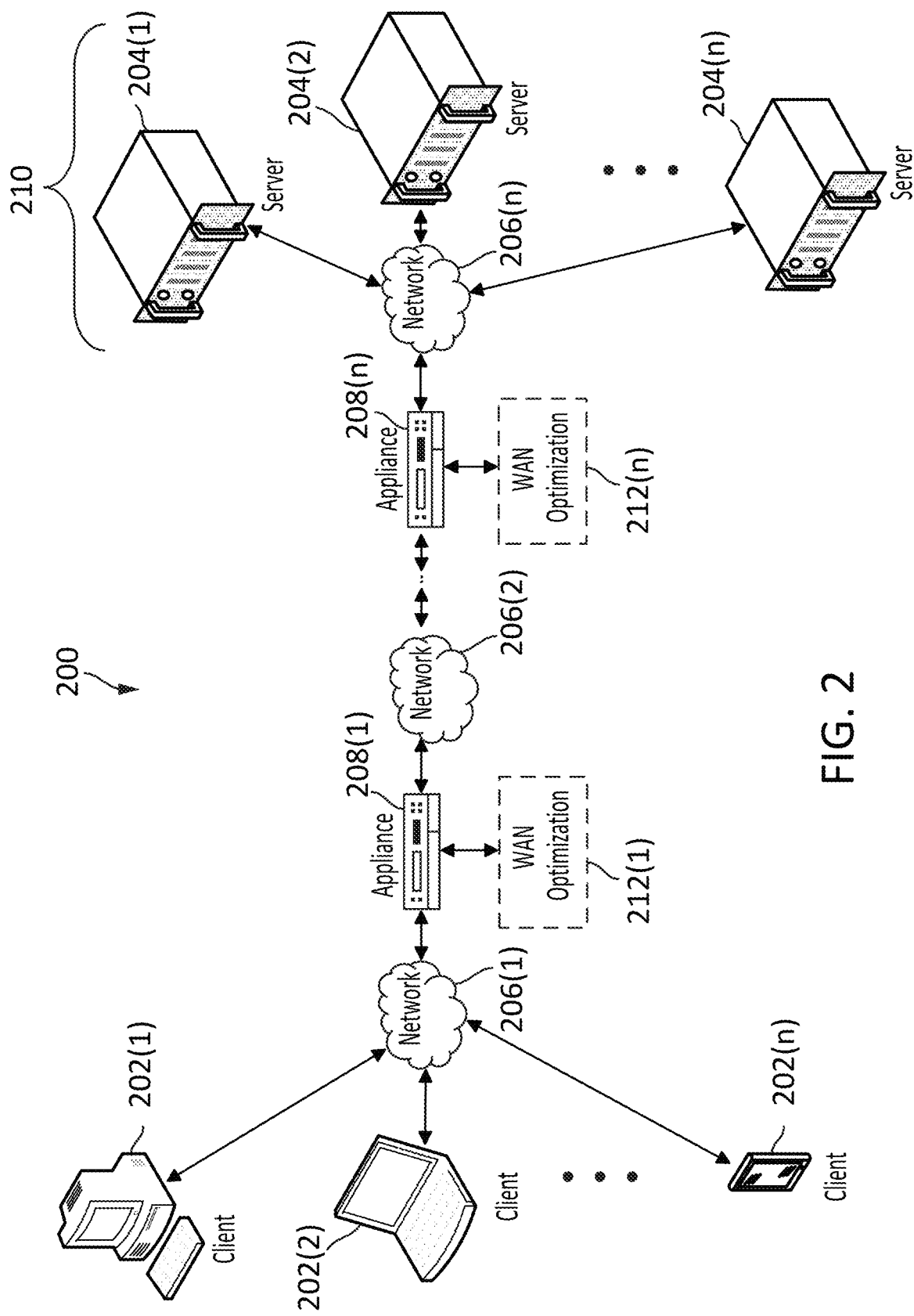
FIG. 2 is a diagram of a network environment in which some embodiments of the systems and methods disclosed herein may deployed.

Referring to FIG. 2, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2 shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may be private networks such as local area network (LANs) or company Intranets, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 206 may include one or more wireless local-area networks (WLANs). For short range communications within a WLAN, clients 202 may communicate using 802.11, Bluetooth, and/or Near Field Communication (NFC).

As shown in FIG. 2, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, appliances 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one or more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2, in some embodiments, groups of the servers 204 may operate as one or more server farms 210. The servers 204 of such server farms 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2, in some embodiments, one or more of the appliances 208 may include, be replaced by, or be in communication with, one or more additional appliances, such as WAN optimization appliances 212(1)-212(n), referred to generally as WAN optimization appliance(s) 212. For example, WAN optimization appliances 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller.

In some embodiments, one or more of the appliances 208, 212 may be implemented as products sold by Citrix Systems, Inc., of Fort Lauderdale, Fla., such as Citrix SD-WAN™ or Citrix Cloud™. For example, in some implementations, one or more of the appliances 208, 212 may be cloud connectors that enable communications to be exchanged between resources within a cloud computing environment and resources outside such an environment, e.g., resources hosted within a data center of+an organization.

C. Computing Environment

Figure 3:
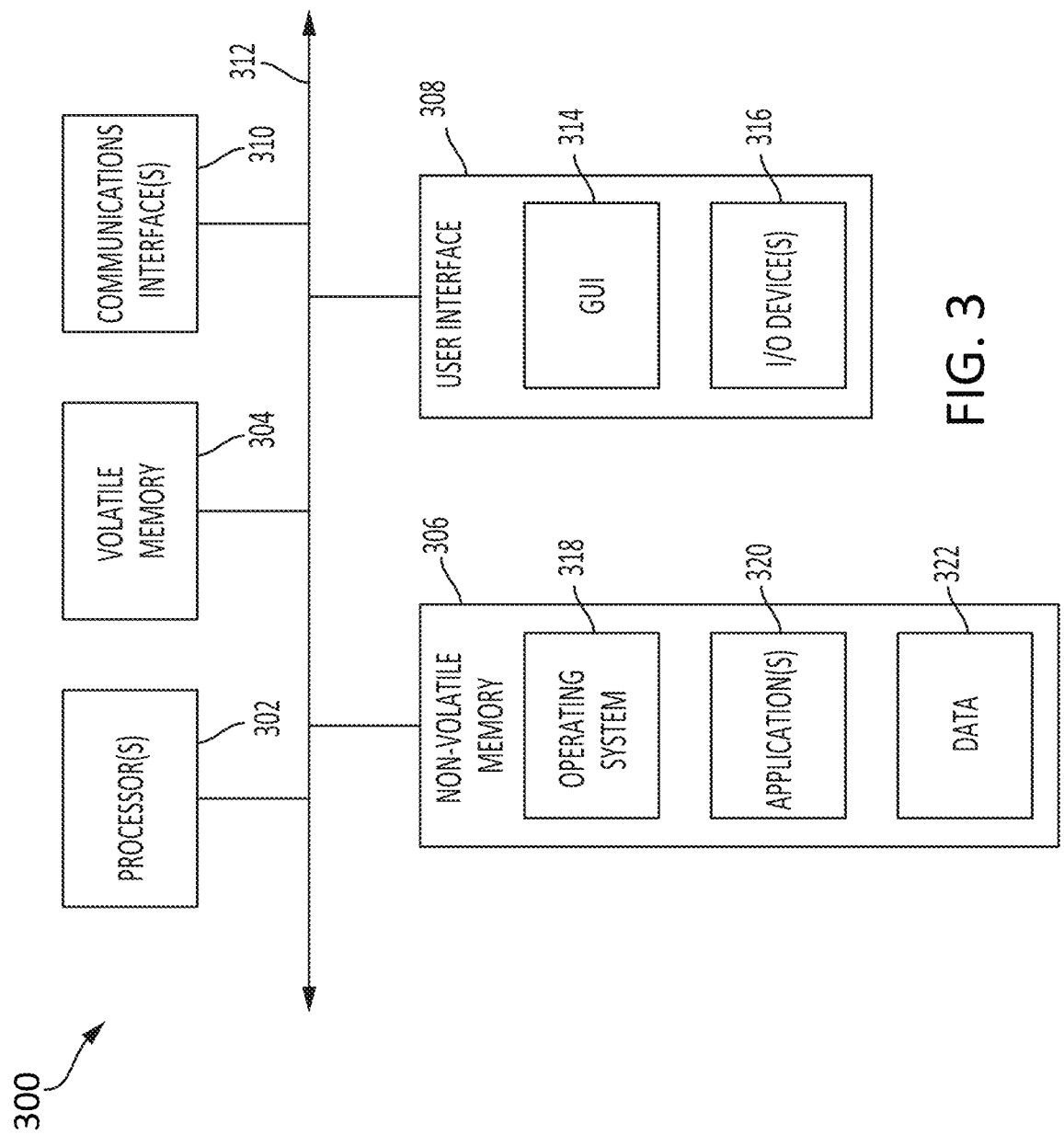
FIG. 3 is a block diagram of a computing system that may be used to implement one or more of the components of the computing environment shown in FIG. 2 in accordance with some embodiments.

FIG. 3 illustrates an example of a computing system 300 that may be used to implement one or more of the respective components (e.g., the clients 202, the servers 204, the appliances 208, 212) within the network environment 200 shown in FIG. 2. As shown in FIG. 3, the computing system 300 may include one or more processors 302, volatile memory 304 (e.g., RAM), non-volatile memory 306 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 308, one or more communications interfaces 310, and a communication bus 312. The user interface 308 may include a graphical user interface (GUI) 314 (e.g., a touchscreen, a display, etc.) and one or more input/output (I/O) devices 316 (e.g., a mouse, a keyboard, etc.). The non-volatile memory 306 may store an operating system 318, one or more applications 320, and data 322 such that, for example, computer instructions of the operating system 318 and/or applications 320 are executed by the processor(s) 302 out of the volatile memory 304. Data may be entered using an input device of the GUI 314 or received from I/O device(s) 316. Various elements of the computing system 300 may communicate via communication the bus 312. The computing system 300 as shown in FIG. 3 is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 302 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 310 may include one or more interfaces to enable the computing system 300 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 300 may execute an application on behalf of a user of a client computing device (e.g., a client 202 shown in FIG. 2), may execute a virtual machine, which provides an execution session within which applications execute on behalf of a user or a client computing device (e.g., a client 202 shown in FIG. 2), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 4:
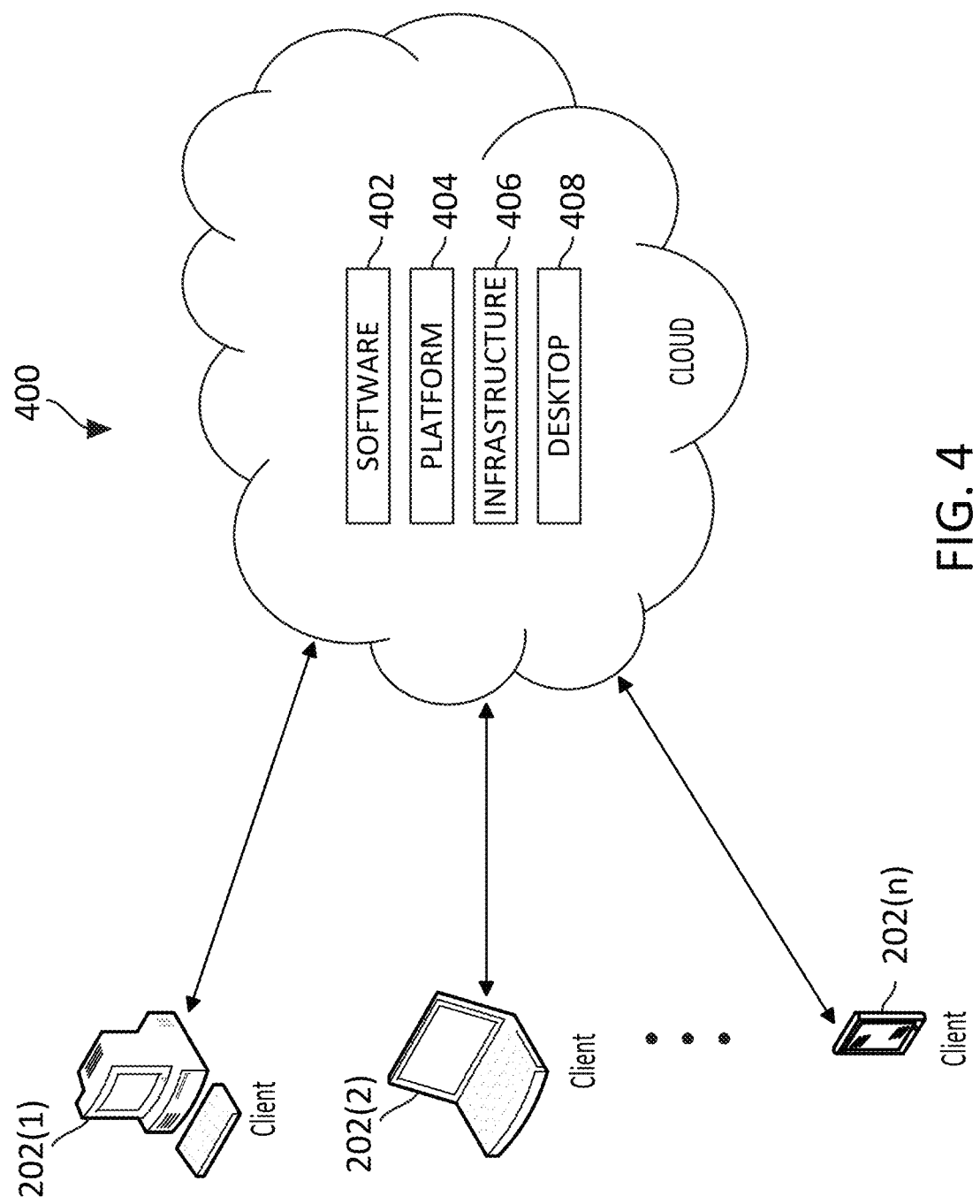
FIG. 4 is a schematic block diagram of a cloud computing environment in which various aspects of the disclosure may be implemented.

D. Systems and Methods for Delivering Shared Resources Using a Cloud Computing Environment Referring to FIG. 4, a cloud computing environment 400 is depicted, which may also be referred to as a cloud environment, cloud computing or cloud network. The cloud computing environment 400 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 400, one or more clients 202 (such as those described in connection with FIG. 2) are in communication with a cloud network 404. The cloud network 404 may include back-end platforms, e.g., servers, storage, server farms and/or data centers. The clients 202 may correspond to a single organization/tenant or multiple organizations/tenants. More particularly, in one example implementation, the cloud computing environment 400 may provide a private cloud serving a single organization (e.g., enterprise cloud). In another example, the cloud computing environment 400 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 400 may provide a hybrid cloud that is a combination of a public cloud and one or more resources located outside such a cloud, such as resources hosted within one or more data centers of an organization. Public clouds may include public servers that are maintained by third parties to the clients 202 or the enterprise/tenant. The servers may be located off-site in remote geographical locations or otherwise. In some implementations, one or more cloud connectors may be used to facilitate the exchange of communications between one more resources within the cloud computing environment 400 and one or more resources outside of such an environment.

The cloud computing environment 400 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 400 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 400 can provide an elasticity to dynamically scale out or scale in response to different demands from one or more clients 202. In some embodiments, the cloud computing environment 400 may include or provide monitoring services to monitor, control and/or generate reports corresponding to the provided shared services and resources.

In some embodiments, the cloud computing environment 400 may provide cloud-based delivery of different types of cloud computing services, such as Software as a service (SaaS) 402, Platform as a Service (PaaS) 404, Infrastructure as a Service (IaaS) 406, and Desktop as a Service (DaaS) 408, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources.

Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure, such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

E. Systems and Methods for Managing and Streamlining Access by Client Devices to a Variety of Resources FIG. 5A is a block diagram of an example multi-resource access system 500 in which one or more resource management services 502 may manage and streamline access by one or more clients 202 to one or more resource feeds 504 (via one or more gateway services 506) and/or one or more software-as-a-service (SaaS) applications 508. In particular, the resource management service(s) 502 may employ an identity provider 510 to authenticate the identity of a user of a client 202 and, following authentication, identify one or more resources the user is authorized to access. In response to the user selecting one of the identified resources, the resource management service(s) 502 may send appropriate access credentials to the requesting client 202, and the client 202 may then use those credentials to access the selected resource. For the resource feed(s) 504, the client 202 may use the supplied credentials to access the selected resource via a gateway service 506. For the SaaS application(s) 508, the client 202 may use the credentials to access the selected application directly.

The client(s) 202 may be any type of computing devices capable of accessing the resource feed(s) 504 and/or the SaaS application(s) 508, and may, for example, include a variety of desktop or laptop computers, smartphones, tablets, etc. The resource feed(s) 504 may include any of numerous resource types and may be provided from any of numerous locations. In some embodiments, for example, the resource feed(s) 504 may include one or more systems or services for providing virtual applications and/or desktops to the client(s) 202, one or more file repositories and/or file sharing systems, one or more secure browser services, one or more access control services for the SaaS applications 508, one or more management services for local applications on the client(s) 202, one or more internet enabled devices or sensors, etc. The resource management service(s) 502, the resource feed(s) 504, the gateway service(s) 506, the SaaS application(s) 508, and the identity provider 510 may be located within an on-premises data center of an organization for which the multi-resource access system 500 is deployed, within one or more cloud computing environments, or elsewhere.

FIG. 5B is a block diagram showing an example implementation of the multi-resource access system 500 shown in FIG. 5A in which various resource management services 502 as well as a gateway service 506 are located within a cloud computing environment 512. The cloud computing environment may, for example, include Microsoft Azure Cloud, Amazon Web Services, Google Cloud, or IBM Cloud. It should be appreciated, however, that in other implementations, one or more (or all) of the components of the resource management services 502 and/or the gateway service 506 may alternatively be located outside the cloud computing environment 512, such as within a data center hosted by an organization.

For any of the illustrated components (other than the client 202) that are not based within the cloud computing environment 512, cloud connectors (not shown in FIG. 5B) may be used to interface those components with the cloud computing environment 512. Such cloud connectors may, for example, run on Windows Server instances and/or Linux Server instances hosted in resource locations and may create a reverse proxy to route traffic between those resource locations and the cloud computing environment 512. In the illustrated example, the cloud-based resource management services 502 include a client interface service 514, an identity service 516, a resource feed service 518, and a single sign-on service 520. As shown, in some embodiments, the client 202 may use a resource access application 522 to communicate with the client interface service 514 as well as to present a user interface on the client 202 that a user 524 can operate to access the resource feed(s) 504 and/or the SaaS application(s) 508. The resource access application 522 may either be installed on the client 202, or may be executed by the client interface service 514 (or elsewhere in the multi-resource access system 500) and accessed using a web browser (not shown in FIG. 5B) on the client 202.

As explained in more detail below, in some embodiments, the resource access application 522 and associated components may provide the user 524 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 522 is launched or otherwise accessed by the user 524, the client interface service 514 may send a sign-on request to the identity service 516. In some embodiments, the identity provider 510 may be located on the premises of the organization for which the multi-resource access system 500 is deployed. The identity provider 510 may, for example, correspond to an on-premises Windows Active Directory. In such embodiments, the identity provider 510 may be connected to the cloud-based identity service 516 using a cloud connector (not shown in FIG. 5B), as described above. Upon receiving a sign-on request, the identity service 516 may cause the resource access application 522 (via the client interface service 514) to prompt the user 524 for the user's authentication credentials (e.g., user-name and password). Upon receiving the user's authentication credentials, the client interface service 514 may pass the credentials along to the identity service 516, and the identity service 516 may, in turn, forward them to the identity provider 510 for authentication, for example, by comparing them against an Active Directory domain. Once the identity service 516 receives confirmation from the identity provider 510 that the user's identity has been properly authenticated, the client interface service 514 may send a request to the resource feed service 518 for a list of subscribed resources for the user 524.

In other embodiments (not illustrated in FIG. 5B), the identity provider 510 may be a cloud-based identity service, such as a Microsoft Azure Active Directory. In such embodiments, upon receiving a sign-on request from the client interface service 514, the identity service 516 may, via the client interface service 514, cause the client 202 to be redirected to the cloud-based identity service to complete an authentication process. The cloud-based identity service may then cause the client 202 to prompt the user 524 to enter the user's authentication credentials. Upon determining the user's identity has been properly authenticated, the cloud-based identity service may send a message to the resource access application 522 indicating the authentication attempt was successful, and the resource access application 522 may then inform the client interface service 514 of the successfully authentication. Once the identity service 516 receives confirmation from the client interface service 514 that the user's identity has been properly authenticated, the client interface service 514 may send a request to the resource feed service 518 for a list of subscribed resources for the user 524.

The resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities. The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

For resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

When the user 524 selects a local application, the resource access application 522 may cause the selected local application to launch on the client 202. When the user 524 selects a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In some embodiments, the preferred browser identified by the gateway service 506 may be a specialized browser embedded in the resource access application 522 (when the resource access application 522 is installed on the client 202) or provided by one of the resource feeds 504 (when the resource access application 522 is located remotely), e.g., via a secure browser service. In such embodiments, the SaaS applications 508 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 504) for assessment of its security risk by a web filtering service. For approved URLs, the specialized browser may be permitted to access the link. For suspicious links, however, the web filtering service may have the client interface service 514 send the link to a secure browser service, which may start a new virtual browser session with the client 202, and thus allow the user to access the potentially harmful linked content in a safe environment.

In some embodiments, in addition to or in lieu of providing the user 524 with a list of resources that are available to be accessed individually, as described above, the user 524 may instead be permitted to choose to access a streamlined feed of event notifications and/or available actions that may be taken with respect to events that are automatically detected with respect to one or more of the resources. This streamlined resource activity feed, which may be customized for individual users, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to events right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 524 of something that requires the user's attention (e.g., approval of an expense report, new course available for registration, etc.).

FIG. 5C is a block diagram similar to that shown in FIG. 5B but in which the available resources (e.g., SaaS applications, web applications, Windows applications, Linux applications, desktops, file repositories and/or file sharing systems, and other data) are represented by a single box 526 labeled "systems of record," and further in which several different services are included within the resource management services block 502. As explained below, the services shown in FIG. 5C may enable the provision of a streamlined resource activity feed and/or notification process for a client 202. In the example shown, in addition to the client interface service 514 discussed above, the illustrated services include a microapp service 528, a data integration provider service 530, a credential wallet service 532, an active data cache service 534, an analytics service 536, and a notification service 538. In various embodiments, the services shown in FIG. 5C may be employed either in addition to or instead of the different services shown in FIG. 5B. Further, as noted above in connection with FIG. 5B, it should be appreciated that, in other implementations, one or more (or all) of the components of the resource management services 502 shown in FIG. 5C may alternatively be located outside the cloud computing environment 512, such as within a data center hosted by an organization.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 522 without having to launch the native application. The system shown in FIG. 5C may, for example, aggregate relevant notifications, tasks, and insights, and thereby give the user 524 a dynamic productivity tool. In some embodiments, the resource activity feed may be intelligently populated by utilizing machine learning and artificial intelligence (AI) algorithms. Further, in some implementations, microapps may be configured within the cloud computing environment 512, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 5C, the systems of record 526 may represent the applications and/or other resources the resource management services 502 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 502, and in particular the data integration provider service 530, may, for example, support REST API, JSON, OData-JSON, and 6ML. As explained in more detail below, the data integration provider service 530 may also write back to the systems of record, for example, using OAuth2 or a service account.

In some embodiments, the microapp service 528 may be a single-tenant service responsible for creating the microapps. The microapp service 528 may send raw events, pulled from the systems of record 526, to the analytics service 536 for processing. The microapp service may, for example, periodically pull active data from the systems of record 526.

In some embodiments, the active data cache service 534 may be single-tenant and may store all configuration information and microapp data. It may, for example, utilize a per-tenant database encryption key and per-tenant database credentials.

In some embodiments, the credential wallet service 532 may store encrypted service credentials for the systems of record 526 and user OAuth2 tokens.

In some embodiments, the data integration provider service 530 may interact with the systems of record 526 to decrypt end-user credentials and write back actions to the systems of record 526 under the identity of the end-user. The write-back actions may, for example, utilize a user's actual account to ensure all actions performed are compliant with data policies of the application or other resource being interacted with.

In some embodiments, the analytics service 536 may process the raw events received from the microapp service 528 to create targeted scored notifications and send such notifications to the notification service 538.

Finally, in some embodiments, the notification service 538 may process any notifications it receives from the analytics service 536. In some implementations, the notification service 538 may store the notifications in a database to be later served in an activity feed. In other embodiments, the notification service 538 may additionally or alternatively send the notifications out immediately to the client 202 as a push notification to the user 524.

In some embodiments, a process for synchronizing with the systems of record 526 and generating notifications may operate as follows. The microapp service 528 may retrieve encrypted service account credentials for the systems of record 526 from the credential wallet service 532 and request a sync with the data integration provider service 530. The data integration provider service 530 may then decrypt the service account credentials and use those credentials to retrieve data from the systems of record 526. The data integration provider service 530 may then stream the retrieved data to the microapp service 528. The microapp service 528 may store the received systems of record data in the active data cache service 534 and also send raw events to the analytics service 536. The analytics service 536 may create targeted scored notifications and send such notifications to the notification service 538. The notification service 538 may store the notifications in a database to be later served in an activity feed and/or may send the notifications out immediately to the client 202 as a push notification to the user 524.

In some embodiments, a process for processing a user-initiated action via a microapp may operate as follows. The client 202 may receive data from the microapp service 528 (via the client interface service 514) to render information corresponding to the microapp. The microapp service 528 may receive data from the active data cache service 534 to support that rendering. The user 524 may invoke an action from the microapp, causing the resource access application 522 to send an action request to the microapp service 528 (via the client interface service 514). The microapp service 528 may then retrieve from the credential wallet service 532 an encrypted Oauth2 token for the system of record for which the action is to be invoked, and may send the action to the data integration provider service 530 together with the encrypted OAuth2 token. The data integration provider service 530 may then decrypt the OAuth2 token and write the action to the appropriate system of record under the identity of the user 524. The data integration provider service 530 may then read back changed data from the written-to system of record and send that changed data to the microapp service 528. The microapp service 528 may then update the active data cache service 534 with the updated data and cause a message to be sent to the resource access application 522 (via the client interface service 514) notifying the user 524 that the action was successfully completed.

In some embodiments, in addition to or in lieu of the functionality described above, the resource management services 502 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 502 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 502 may, for example, parse these requests and respond because they are integrated with multiple systems on the back-end. In some embodiments, users may be able to interact with the virtual assistant through either the resource access application 522 or directly from another resource, such as Microsoft Teams. This feature may allow employees to work efficiently, stay organized, and deliver only the specific information they're looking for.

Figure 5D:
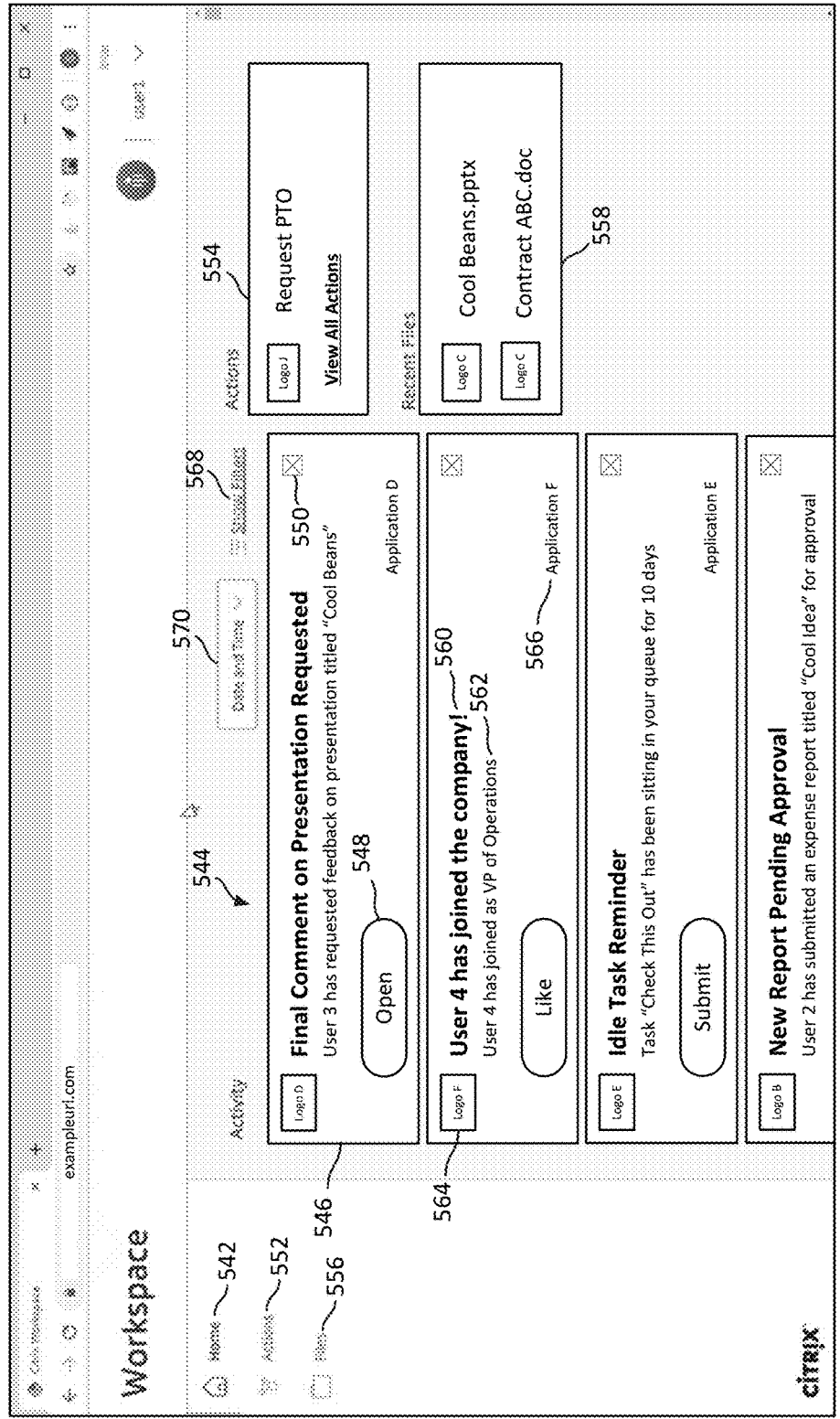
FIG. 5D shows how a display screen may appear when an intelligent activity feed feature of a multi-resource management system, such as that shown in FIG. 5C, is employed.

FIG. 5D shows how a display screen 540 presented by a resource access application 522 (shown in FIG. 5C) may appear when an intelligent activity feed feature is employed and a user is logged on to the system. Such a screen may be provided, for example, when the user clicks on or otherwise selects a "home" user interface element 542. As shown, an activity feed 544 may be presented on the screen 540 that includes a plurality of notifications 546 about respective events that occurred within various applications to which the user has access rights. An example implementation of a system capable of providing an activity feed 544 like that shown is described above in connection with FIG. 5C. As explained above, a user's authentication credentials may be used to gain access to various systems of record (e.g., SalesForce, Ariba, Concur, RightSignature, etc.) with which the user has accounts, and events that occur within such systems of record may be evaluated to generate notifications 546 to the user concerning actions that the user can take relating to such events. As shown in FIG. 5D, in some implementations, the notifications 546 may include a title 560 and a body 562, and may also include a logo 564 and/or a name 566 of the system or record to which the notification 546 corresponds, thus helping the user understand the proper context with which to decide how best to respond to the notification 546. In some implementations, one or more filters may be used to control the types, date ranges, etc., of the notifications 546 that are presented in the activity feed 544. The filters that can be used for this purpose may be revealed, for example, by clicking on or otherwise selecting the "show filters" user interface element 568. Further, in some embodiments, a user interface element 570 may additionally or alternatively be employed to select a manner in which the notifications 546 are sorted within the activity feed. In some implementations, for example, the notifications 546 may be sorted in accordance with the "date and time" they were created (as shown for the element 570 in FIG. 5D), a "relevancy" mode (not illustrated) may be selected (e.g., using the element 570) in which the notifications may be sorted based on relevancy scores assigned to them by the analytics service 536, and/or an "application" mode (not illustrated) may be selected (e.g., using the element 570) in which the notifications 546 may be sorted by application type.

When presented with such an activity feed 544, the user may respond to the notifications 546 by clicking on or otherwise selecting a corresponding action element 548 (e.g., "Approve," "Reject," "Open," "Like," "Submit," etc.), or else by dismissing the notification, e.g., by clicking on or otherwise selecting a "close" element 550. As explained in connection with FIG. 5C below, the notifications 546 and corresponding action elements 548 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 546 (e.g., in a separate, pop-up window corresponding to the microapp) by clicking on or otherwise selecting a portion of the notification 546 other than one of the user-interface elements 548, 550. In some embodiments, the user may additionally or alternatively be able to select a user interface element either within the notification 546 or within a separate window corresponding to the microapp that allows the user to launch the native application to which the notification relates and respond to the event that prompted the notification via that native application rather than via the microapp. In addition to the event-driven actions accessible via the action elements 548 in the notifications 546, a user may alternatively initiate microapp actions by selecting a desired action, e.g., via a drop-down menu accessible using the "action" user-interface element 552 or by selecting a desired action from a list 554 of recently and/or commonly used microapp actions. As shown, the user may also access files (e.g., via a Citrix ShareFile™ platform) by selecting a desired file, e.g., via a drop-down menu accessible using the "files" user interface element 556 or by selecting a desired file from a list 558 of recently and/or commonly used files.

Although not shown in FIG. 5D, it should be appreciated that, in some implementations, additional resources may also be accessed through the screen 540 by clicking on or otherwise selecting one or more other user interface elements that may be presented on the screen. For example, in some embodiments, one or more virtualized applications may be accessible (e.g., via a Citrix Virtual Apps and Desktops™ service) by clicking on or otherwise selecting an "apps" user-interface element (not shown) to reveal a list of accessible applications and/or one or more virtualized desktops may be accessed (e.g., via a Citrix Virtual Apps and Desktops™ service) by clicking on or otherwise selecting a "desktops" user-interface element (not shown) to reveal a list of accessible desktops.

The activity feed shown in FIG. 5D provides significant benefits, as it allows a user to respond to application-specific events generated by disparate systems of record without needing to navigate to, launch, and interface with multiple different native applications.

Figure 6:
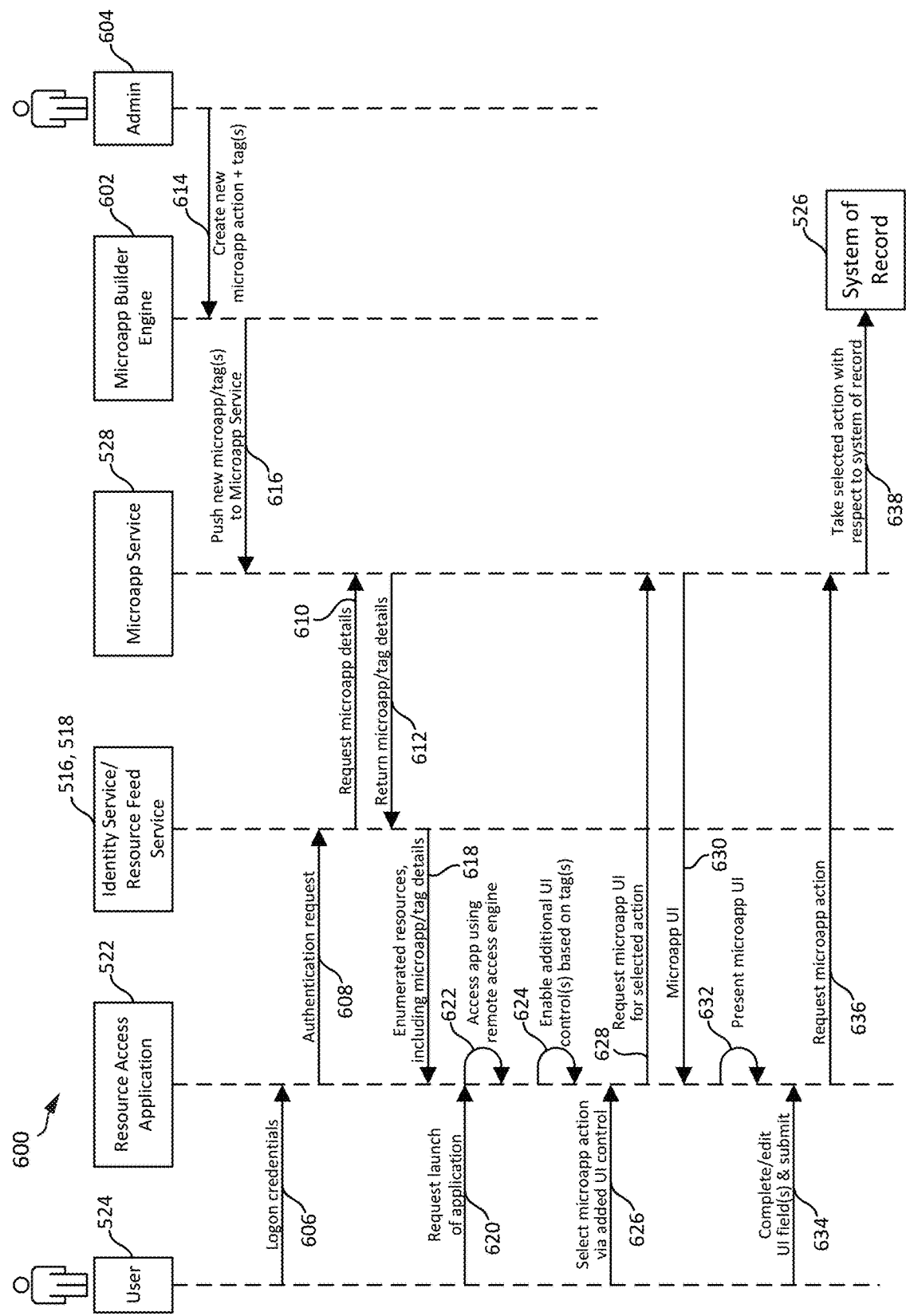
FIG. 6 is a sequence diagram showing details of a first example configuration of a system for invoking microapp actions from user applications, as introduced above in Section A.
Figure 7:
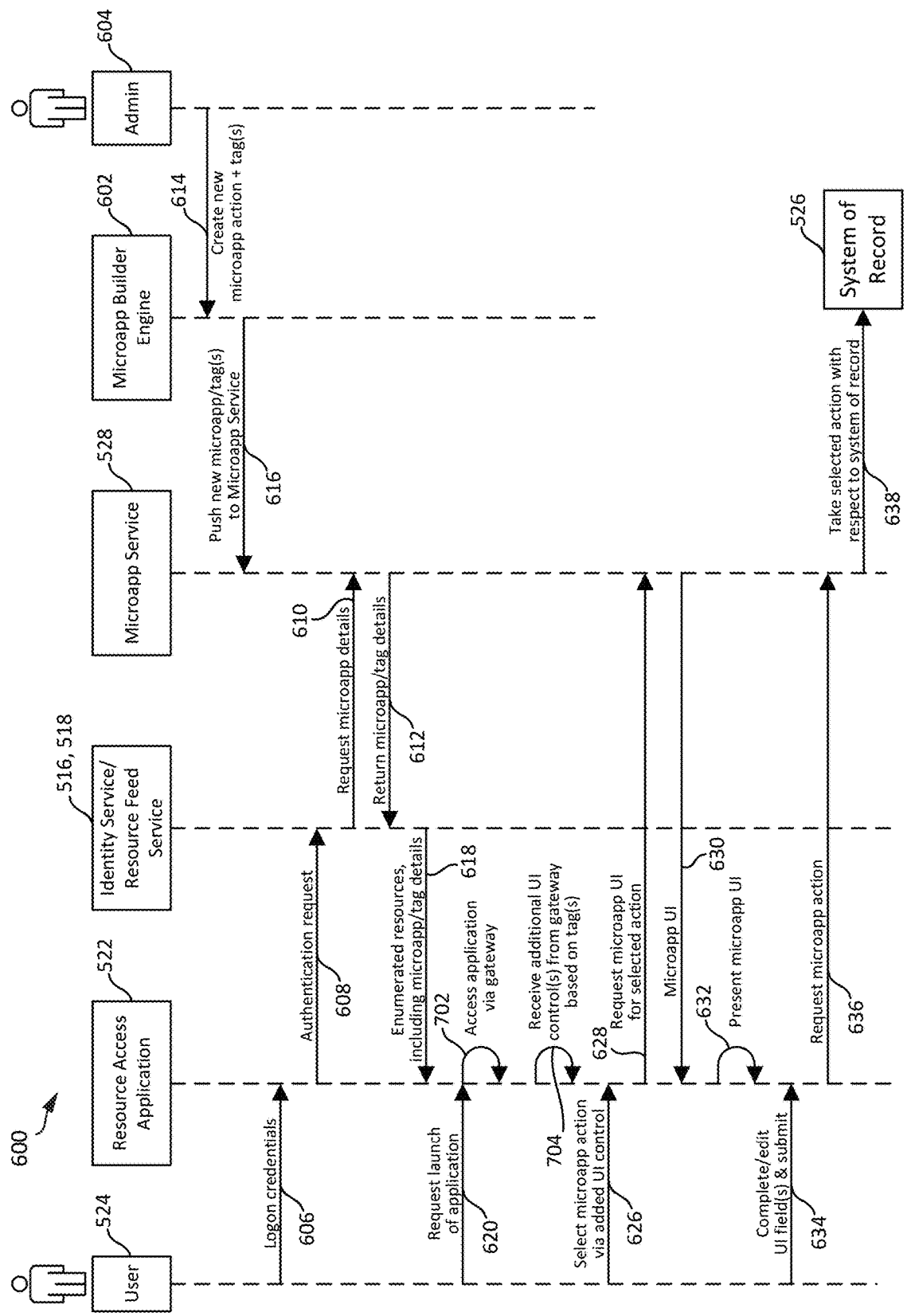
FIG. 7 is a sequence diagram showing details of a second example configuration of a system for invoking microapp actions from user applications, as introduced above in Section A.
Figure 8:
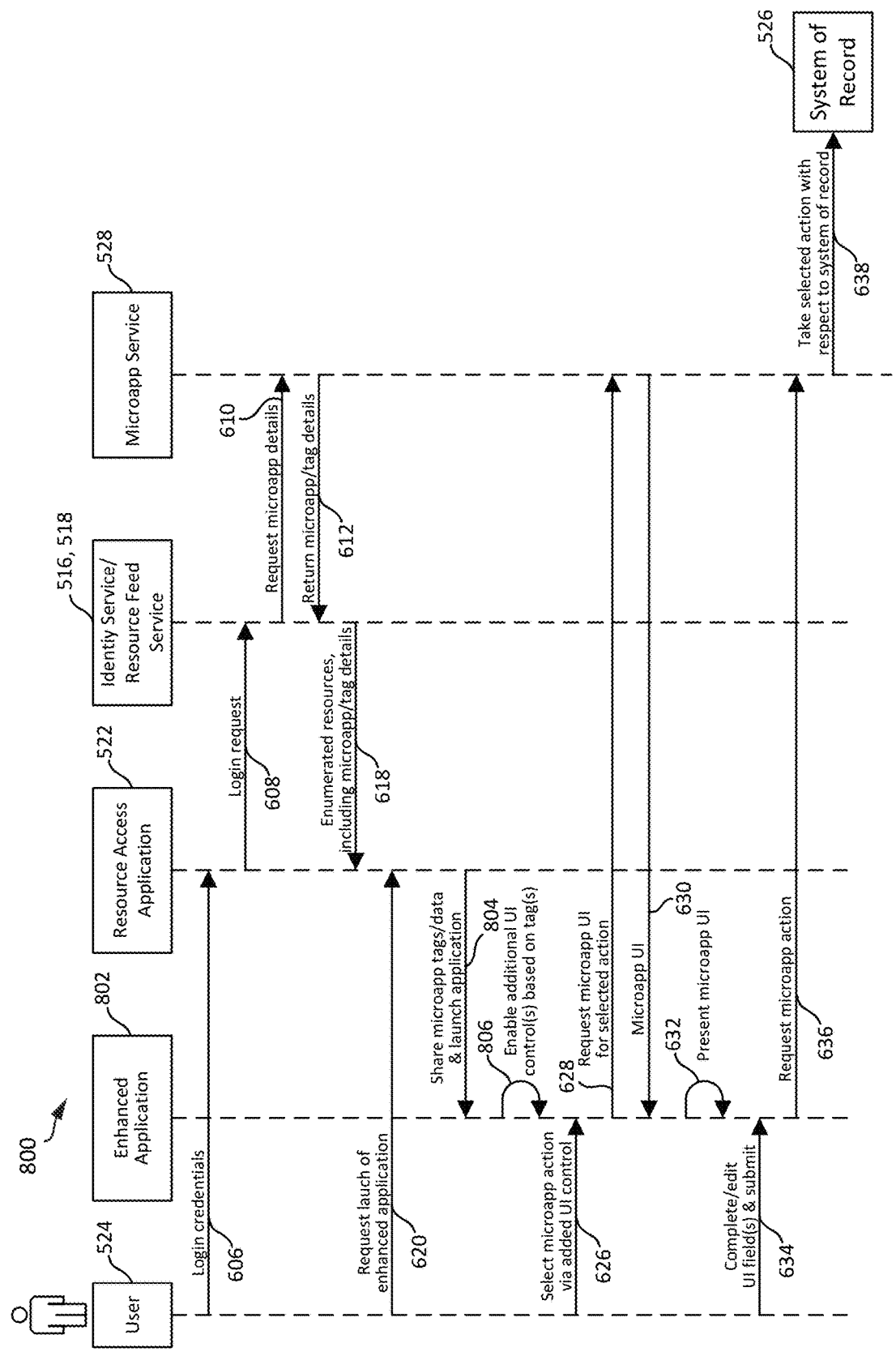
FIG. 8 is a sequence diagram showing details of a third example configuration of a system for invoking microapp actions from user applications, as introduced above in Section A.

F. Detailed Description of Example Embodiments of Systems for Invoking Microapp Actions from User Applications FIGS. 6-8 are sequence diagrams showing illustrative implementations of respective example systems 600, 700, 800 for invoking microapp actions from user applications in accordance with some aspects of the present disclosure. Although the systems 600, 700, 800 are described in the context of the multi-resource access system 500 described above in connection with FIGS. 5A-D, it should be appreciated that the inventive concepts described herein may likewise be implemented in other environments without departing from the present disclosure. As illustrated, the systems 600, 700, 800 may include several components of the multi-resource access system 500 described above in connection with FIGS. 5A-D, including the resource access application 522 (shown in FIGS. 5B and 5C), the identity service 516 and the resource feed service 518 (which are both shown, separately, in FIG. 5B), and the microapp service 528 (shown in FIG. 5C).

As described below, the systems 600, 700, 800 may interact with at least one system of record 526 which, as described below, may correspond to any of a number of resources that can be accessed by a user 524 via the multi-resource access system 500. Further as illustrated in FIGS. 6 and 7, the systems 600, 700, 800 may additionally include a microapp builder engine 602 to allow a system administrator 604 to create new microapp actions for particular systems of record 526, and to assign one or more tags to such newly created microapp actions, for use in determining whether and/or how to present special user interface elements to the user when the user 524 is accessing a user application. In the systems 600 and 700, the user application that is used to invoke a microapp action is not illustrated. As described below, in those systems, such a user application may be remote from the client device. As shown in FIG. 6, in the system 600, such a user application may be accessed using a remote access engine, such as a browser, e.g., the embedded browser of the resource access application 522, e.g., as a SasS service, or an access engine of an application or desktop delivery system, e.g., a high definition experience (HDX) engine of the Citrix Workspace™ family of products.

As shown in FIG. 7, in the system 700, the user application may be accessed via a gateway, e.g., via the gateway service 506 described above in connection with FIG. 5B. In the system 800, the user application that is used to invoke the microapp action may be either local to or remote from the client device 202, e.g., as an enhanced application 802, such as that illustrated. As explained in more detail below, the enhanced application 802 may include an add-in or a plug-in that causes the one or more special user interface elements to be presented on the client device 202 in response to particular user inputs (e.g., right-clicking) based on one or more tags that are assigned to microapp actions that have been enumerated for the client device 202.

The sequence diagrams shown in FIGS. 6 and 7 will now be described together, as the only salient difference between those two diagrams relates to the manner in which a selected user application is accessed (compare action 622 in FIG. 6 with action 702 in FIG. 7) and the manner in which one or more special user interface elements are provided within such applications based on microapp action tags (compare action 624 in FIG. 6 with action 704 in FIG. 7). Those differences will be described in detail below. The numbers in parentheses in the following description refer to the actions/messages in the illustrated sequence diagrams.

As shown in FIGS. 6 and 7, in response to the user 524 providing (606) logon credentials, e.g., a user name and password, to the resource access application 522 (on a client device 202), the resource access application 522 may send (608) an authentication request to the resource management services 502 (shown in FIG. 5B), which services include the identity service 516 and the resource feed service 518.

As noted above (in Section E), with reference to FIG. 5B, once the identity service 516 receives confirmation from the identity provider 510 that the user's identity has been properly authenticated, the client interface service 514 may send a request to the resource feed service 518 for a list of subscribed resources for the user 524. As also noted above in Section E, the resource feed service 518 may request identity tokens for configured resources from the single sign-on service 520. The resource feed service 518 may then pass the feed-specific identity tokens it receives to the points of authentication for the respective resource feeds 504. The resource feeds 504 may then respond with lists of resources configured for the respective identities.

The resource feed service 518 may then aggregate all items from the different feeds and forward them to the client interface service 514, which may cause the resource access application 522 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 508 to which the user 524 has subscribed. The lists of local applications and the SaaS applications 508 may, for example, be supplied by resource feeds 504 for respective services that manage which such applications are to be made available to the user 524 via the resource access application 522. Examples of SaaS applications 508 that may be managed and accessed as described herein include Microsoft Office 365 applications, SAP SaaS applications, Workday applications, etc.

In addition to the resources noted above, the resource feed service 518 may identify one or more micoapp actions that are to be made available to the client device 202 via the microapp service 528 (shown in FIG. 5C), such as by being presented in the action list 554 (shown in FIG. 5D) and/or as may be accessed using the "action" user-interface element 552 (also shown in FIG. 5D). Referring again to FIGS. 6 and 7, the resource feed service 518 may request (610) details from the microapp service 528 concerning the microapps that have been enumerated for the user 524, and the microapp service 528 may return (612) those details. As indicated, among the returned microapp details may be one or more tags that have been assigned to microapp actions.

As shown on the right-hand side of FIGS. 6 and 7, the system administrator 604 may operate (614) a microapp builder engine 602 to create microapp apps and microapp actions. For example, the system administrator 604 may identify particular actions that can be performed within particular systems of record 526, and may create respective microapp actions that may be invoked to perform those actions via one or more APIs of the system of record 526, without needing to launch the full application for that system. For example, as noted above, the system administrator 604 may create a microapp action to create a new task within a task management application, such as Trello or Jira. Further, to indicate that the new microapp action is to be made accessible via a user interface of one or more user applications, the system administrator 604 may additionally apply one or more tags to the new microapp action. Examples of such tags were provided above in Section A. As shown in FIGS. 6 and 7, once generated by the microapp builder engine 602, the newly-created microapp actions and corresponding tags may be pushed (616) to the microapp service 528, so as to be made available for enumeration to client device 202.

After the resource feed service 518 has received (from the microapp service 528) the details concerning the microapp actions and corresponding tags that have been enumerated for the client device 202, the resource feed service may then provide (618) the resource access application 522 with a list of enumerated resources, including the details of any available microapp actions and corresponding tags. As noted above, upon receiving such information, the resource access application 522 may present a user interface, similar to the display screen 540 shown in FIG. 5D, that may allow the user 524 to select a user application, from among the enumerated resources, that is to be launched.

As shown in FIGS. 6 and 7, the user 524 may provide (620) an input to the resource access application 522 requesting that a selected application be launched, such as by double clicking on an icon for the application, or the like. In response to receiving such an input, the resource access application 522 may cause the selected user application to be launched (622) using a remote access engine, such as an embedded browser of the resource access application 522, or an access engine of an application or desktop delivery system, e.g., an HDX engine of the Citrix Workspace™ family of products. In the example implementation shown in FIG. 6, the remote access engine may include, or may be supplemented with an add-in or plug-in that includes, logic that, based on the tags applied to enumerated microapp actions, may enable (624) the presentation one or more special user interface controls, in addition to the various user interface controls already enabled for the application, that allow the user to invoke microapp actions. For example, as noted above, a user may invoke a particular microapp action from a window of the launched application by selecting text or some other item within the window and then right-clicking to expose the additional user interface elements that are based on microapp action tags that have been applied. Providing such logic within the remote access engine (e.g., a browser, an HDX engine, etc.) may be beneficial, for example, in scenarios where the user application is accessed directly over the Internet, such as with SaaS applications or applications delivered via an application or desktop delivery system.

As discussed above in Section E, with reference to FIG. 5B, when the user 524 provides an input to launch a SaaS application 508, the resource access application 522 may cause the client interface service 514 to request a one-time uniform resource locator (URL) from the gateway service 506 as well a preferred browser for use in accessing the SaaS application 508. After the gateway service 506 returns the one-time URL and identifies the preferred browser, the client interface service 514 may pass that information along to the resource access application 522. The client 202 may then launch the identified browser and initiate a connection to the gateway service 506. The gateway service 506 may then request an assertion from the single sign-on service 520. Upon receiving the assertion, the gateway service 506 may cause the identified browser on the client 202 to be redirected to the logon page for identified SaaS application 508 and present the assertion. The SaaS may then contact the gateway service 506 to validate the assertion and authenticate the user 524. Once the user has been authenticated, communication may occur directly between the identified browser and the selected SaaS application 508, thus allowing the user 524 to use the client 202 to access the selected SaaS application 508.

In the example implementation shown in FIG. 7, the client device 202 may access the selected application via a gateway connection, such as may be provided by the gateway service 506. As noted above in Section E, in the multi-resource access system 500 (described in connection with FIGS. 5A-D), for resources other than local applications and the SaaS application(s) 508, upon the user 524 selecting one of the listed available resources, the resource access application 522 may cause the client interface service 514 to forward a request for the specified resource to the resource feed service 518. In response to receiving such a request, the resource feed service 518 may request an identity token for the corresponding feed from the single sign-on service 520. The resource feed service 518 may then pass the identity token received from the single sign-on service 520 to the client interface service 514 where a launch ticket for the resource may be generated and sent to the resource access application 522. Upon receiving the launch ticket, the resource access application 522 may initiate a secure session to the gateway service 506 and present the launch ticket. When the gateway service 506 is presented with the launch ticket, it may initiate a secure session to the appropriate resource feed and present the identity token to that feed to seamlessly authenticate the user 524. Once the session initializes, the client 202 may proceed to access the selected resource.

In such an implementation, where the user application may be accessed (702) via a gateway, the gateway service 506 may insert code, e.g., Javascript, into the user application the gateway service 506 is feeding to the client device 202, which code may, based on the tags applied to enumerated microapp actions, enable (704) the presentation one or more special user interface controls, in addition to the various user interface controls already enabled for the application, that allow the user to invoke microapp actions.

As shown in FIGS. 6 and 7, the user 524 operating the selected user application may select (626) a particular microapp action using the supplemental user interface control(s) that are provided based on the microapp action tags. For example, as noted above, in some implementations, the user 524 may select text or other item within a window of the user application and right-click or take some other action to expose the special UI control to invoke a particular microapp action, and may then select such a UI control (e.g., from a nested menu of possible actions). Upon detecting such a selection, the resource access application 522 may present (632) an additional user interface on the client device 202 for performing the indicated action. As shown in FIGS. 6 and 7, in some implementations, the resource access application 522 may request (628) such an additional user interface from the microapp service 528, and the microapp service 528 may return (630) the requested additional user interface. In some implementation, the microapp service 528 may process the information selected from the application, as well as a URL for the app, if any, or the like, to pre-populate one or more fields in the additional user interface. In other implementations, the logic to generate the additional user interface and/or evaluate selected information, etc., to pre-populate its fields may already exist in the resource access application 522 and/or may have been included in the microapp information that was provided to the resource access application 522 per the message 618 (described above).

After the additional user interface is presented (632), the user may complete blank fields in the action request and/or edit information in pre-populated fields, and may then take an action, e.g., clicking a "submit" button, to cause the request to be submitted (636) to the microapp service 528, thus triggering the microapp action. Upon receiving the microapp action request, the microapp service 528 may take the identified action with respect to the system of record 526, such as by instructing the data integration provider service 530 (shown in FIG. 5C) to interact with the system of record 526 using one or more APIs.

Although not illustrated in FIGS. 6 and 7, it should be appreciated that the microapp service 528 may additionally send a confirmation message to the resource access application 522, indicating that the requested action has been successfully taken with respect to the indicated system of record 526.

The sequence diagram shown in FIG. 8 illustrates an example scenario in which logic to enable the presentation of one or more user special interface elements for a user application, as described above, may be included within the user application itself, rather than being external to it, such as in a remote access engine of the resource access application 522 or the gateway service 506. In particular, the enhanced application 802 shown in FIG. 8 may be a user application that has an add-in or plug-in that provides logic that, based on the tags applied to enumerated microapp actions, may enable (624) the presentation one or more special user interface controls, in addition to the various user interface controls already enabled for the application, that allow the user to invoke microapp actions.

Although not shown in FIG. 8, as was discussed above in connection with FIGS. 6 and 7, the system administrator 604 may use the microapp builder engine 602 to generate new microapp actions and assign tags to such new actions. Further, the actions 606, 608, 610, 612, 618 and 620 shown in FIG. 8 may be the same as the corresponding actions described in connection with FIGS. 7 and 8, and thus will not be described again here.

The first significant difference between the processes employed by the system 800 and the systems 600, 700 appears when, in response to the user 524 requesting the launch of a selected user application, the resource access application 522 triggers (804) the enhanced application 802 to launch, either on the client device 202 or elsewhere. Further, in the system 800, the enhanced application 802 itself includes (e.g., via an add-in or plug-in enhancement) logic that enables (806) the presentation of one or more special user interface controls, in addition to the various user interface controls already enabled for the application, that allow the user to invoke microapp actions. As indicated, in some implementations, the resource access application 522 may additionally share (804) information concerning the microapp actions and corresponding tags with the enhanced application 802 to enable the additional logic of the enhanced application 802 to determine whether and/or how to present one or more special user interface elements to invoke particular microapp actions. The remainder of the sequence diagram for the system 800, i.e., actions/messages 626, 628, 630, 632, 634, 636, and 638, may be the same as the corresponding actions described in connection with FIGS. 7 and 8, and thus will not be described again here.

Further, as was the case with FIGS. 6 and 7, although not illustrated in FIG. 8, it should be appreciated that the microapp service 528 may additionally send a confirmation message to the resource access application 522 and/or the enhanced application 802, indicating that the requested action has been successfully taken with respect to the indicated system of record 526.

G. Example Implementations of Methods, Systems, and Computer-Readable Media in Accordance with the Present Disclosure The following paragraphs (M1) through (M16) describe examples of methods that may be implemented in accordance with the present disclosure.

(M1) A method may be performed that involves receiving, by a first application accessed by a client device, a first indicator of a first action that a second application is configured to take with respect to a third application; accessing, by the client device, a fourth application; presenting, by the client device and based at least in part on the first indicator received by the first application, at least a first user interface element for the fourth application; detecting, by the client device, selection of the first user interface element; presenting, by the client device and based at least in part on selection of the first user interface element, a user interface configured to cause the second application to take the first action with respect to the third application in response to a user input; detecting, by the client device, the user input to the user interface; and causing, by the client device and based at least in part on the user input, the second application to perform the first action with respect to the third application.

(M2) A method may be performed as described in paragraph (M1), and may further involve receiving, by the first application, a second indicator that indicates the fourth application can be accessed by the client device; displaying, by the client device and based at least in part on the second indicator, a second user interface element corresponding to the fourth application; detecting, by the first application, selection of the second user interface element; and enabling, by the first application, access to the fourth application based at least in part on the selection of the second user interface element.

(M3) A method may be performed as described in paragraph (M2), wherein the fourth application may be remote from the client device; and access to the fourth application may be enabled at least in part by configuring a remote access engine of the first application to access the fourth application.

(M4) A method may be performed as described in paragraph (M3), and may further involve determining, by the remote access engine, to present the first user interface element based at least in part on the first indicator.

(M5) A method may be performed as described in paragraph (M2), wherein the fourth application may be remote from the client device; and access to the fourth application may be enabled at least in part by causing a connection to be established between the client device and a gateway that is in communication with the fourth application so as to enable the client device to access the fourth application via the gateway.

(M6) A method may be performed as described in paragraph (M5), and may further involve sending, by the gateway to the client device, code that causes the first user interface element to be presented based at least in part on the first indicator.

(M7) A method may be performed as described in paragraph (M2), wherein access to the fourth application may be enabled at least in part by launching the fourth application.

(M8) A method may be performed as described in paragraph (M7), and may further involve determining, by the fourth application, to present the first user interface element based at least in part on the first indicator.

(M9) A method may be performed as described in any of paragraphs (M1) through (M8), wherein the second application may comprise a microapp of a microapp service that is remote from the client device; and the second application may be caused to perform the first action at least in part by sending a first message to the microapp, wherein the first message causes the microapp to perform the first action via an application programming interface (API) of the third application.

(M10) A method may be performed as described in any of paragraphs (M1) through (M9), and may further involve detecting selection of information presented by the fourth application; causing the user interface to include at least a portion of the selected information; and causing the second application to perform the first action using the portion of the selected information.

(M11) A method may be performed that involves identifying a first indicator of a first action that a first application is configured to take with respect to a second application; accessing, by a client device, a third application; detecting selection of information presented by the third application; presenting, by the client device and based at least in part on the first indicator, at least a first user interface element for the third application; detecting selection of the first user interface element; presenting, by the client device and based at least in part on selection of the first user interface element, a user interface configured to cause the first application to take the first action with respect to the second application in response to a user input, the user interface including at least a portion of the selected information; detecting, by the client device, the user input to the user interface; and causing, by the client device and based at least in part on the user input, the first application to perform the first action with respect to the second application using the portion of the selected information.

(M12) A method may be performed as described in paragraph (M11), and wherein the selection of information may comprise detecting selection of text output by the third application.

(M13) A method may be performed as described in paragraph (M11) or paragraph (M12), wherein the third application may be remote from the client device, and the method may further involve configuring a remote access engine of the client device to access the third application; and determining, by the remote access engine, to present the first user interface element based at least in part on the first indicator.

(M14) A method may be performed as described in paragraph (M11) or paragraph (M12), wherein the third application may be remote from the client device, and the method may further involve causing a connection to be established between the client device and a gateway that is in communication with the third application so as to enable the client device to access the third application via the gateway; and sending, by the gateway to the client device, code that causes the first user interface element to be presented based at least in part on the first indicator.

(M15) A method may be performed as described in paragraph (M11) or paragraph (M12), and may further involve determining, by the third application, to present the first user interface element based at least in part on the first indicator.

(M16) A method may be performed as described in any of paragraphs (M11) through (M15), wherein the first application may comprise a microapp of a microapp service that is remote from the client device; and the first application may be caused to perform the first action at least in part by sending a first message to the microapp, wherein the first message causes the microapp to perform the first action via an application programming interface (API) of the second application.

The following paragraphs (S1) through (S16) describe examples of systems and devices that may be implemented in accordance with the present disclosure.

(S1) A computing system may comprise at least one processor and at least one computer-readable medium encoded with instructions which, when executed by the at least one processor, cause the computing system to receive, by a first application accessed by a client device, a first indicator of a first action that a second application is configured to take with respect to a third application; to access, by the client device, a fourth application; to present, by the client device and based at least in part on the first indicator received by the first application, at least a first user interface element for the fourth application; detecting, by the client device, selection of the first user interface element; to present, by the client device and based at least in part on selection of the first user interface element, a user interface configured to cause the second application to take the first action with respect to the third application in response to a user input; to detect, by the client device, the user input to the user interface; and to cause, by the client device and based at least in part on the user input, the second application to perform the first action with respect to the third application.

(S2) A computing system may be configured as described in paragraph (S1), and the at least one computer-readable medium may be encoded with additional instructions which, when executed by the at least one processor, may further cause the computing system to receive, by the first application, a second indicator that indicates the fourth application can be accessed by the client device; to display, by the client device and based at least in part on the second indicator, a second user interface element corresponding to the fourth application; to detect, by the first application, selection of the second user interface element; and to enable, by the first application, access to the fourth application based at least in part on the selection of the second user interface element.

(S3) A computing system may be configured as described in paragraph (S2), wherein the fourth application may be remote from the client device; and the at least one computer-readable medium may be encoded with additional instructions which, when executed by the at least one processor, may further cause the computing system to enable access to the fourth application at least in part by configuring a remote access engine of the first application to access the fourth application.

(S4) A computing system may be configured as described in paragraph (S3), and the at least one computer-readable medium may be encoded with additional instructions which, when executed by the at least one processor, may further cause the computing system to determine, by the remote access engine, to present the first user interface element based at least in part on the first indicator.

(S5) A computing system may be configured as described in paragraph (S2), wherein the fourth application may be remote from the client device; and the at least one computer-readable medium may be encoded with additional instructions which, when executed by the at least one processor, may further cause the computing system to enable access to the fourth application at least in part by causing a connection to be established between the client device and a gateway that is in communication with the fourth application so as to enable the client device to access the fourth application via the gateway.

(S6) A computing system may be configured as described in paragraph (S5), and the at least one computer-readable medium may be encoded with additional instructions which, when executed by the at least one processor, may further cause the computing system to send, by the gateway to the client device, code that causes the first user interface element to be presented based at least in part on the first indicator.

(S7) A computing system may be configured as described in paragraph (S2), and the at least one computer-readable medium may be encoded with additional instructions which, when executed by the at least one processor, may further cause the computing system to enable access to the fourth application at least in part by launching the fourth application.

(S8) A computing system may be configured as described in paragraph (S7), and the at least one computer-readable medium may be encoded with additional instructions which, when executed by the at least one processor, may further cause the computing system to determine, by the fourth application, to present the first user interface element based at least in part on the first indicator.

(S9) A computing system may be configured as described in any of paragraphs (S1) through (S8), wherein the second application may comprise a microapp of a microapp service that is remote from the client device; and the at least one computer-readable medium may be encoded with additional instructions which, when executed by the at least one processor, may further cause the computing system to cause the second application to perform the first action at least in part by sending a first message to the microapp, wherein the first message causes the microapp to perform the first action via an application programming interface (API) of the third application.

(S10) A computing system may be configured as described in any of paragraphs (S1) through (S9), and the at least one computer-readable medium may be encoded with additional instructions which, when executed by the at least one processor, may further cause the computing system to detect selection of information presented by the fourth application; to cause the user interface to include at least a portion of the selected information; and to cause the second application to perform the first action using the portion of the selected information.

(S11) A computing system may comprise at least one processor and at least one computer-readable medium encoded with instructions which, when executed by the at least one processor, cause the computing system to identify a first indicator of a first action that a first application is configured to take with respect to a second application; to access, by a client device, a third application; to detect selection of information presented by the third application; to present, by the client device and based at least in part on the first indicator, at least a first user interface element for the third application; to detect selection of the first user interface element; to present, by the client device and based at least in part on selection of the first user interface element, a user interface configured to cause the first application to take the first action with respect to the second application in response to a user input, the user interface including at least a portion of the selected information; to detect, by the client device, the user input to the user interface; and to cause, by the client device and based at least in part on the user input, the first application to perform the first action with respect to the second application using the portion of the selected information.

(S12) A computing system may be configured as described in paragraph (S11), and the at least one computer-readable medium may be encoded with additional instructions which, when executed by the at least one processor, may further cause the computing system to detect the selection of information at least in part by detecting selection of text output by the third application.

(S13) A computing system may be configured as described in paragraph (S11) or paragraph (S12), wherein the third application may be remote from the client device, and the at least one computer-readable medium may be encoded with additional instructions which, when executed by the at least one processor, may further cause the computing system to configure a remote access engine of the client device to access the third application; and to determine, by the remote access engine, to present the first user interface element based at least in part on the first indicator.

(S14) A computing system may be configured as described in paragraph (S11) or paragraph (S12), wherein the third application may be remote from the client device, and the at least one computer-readable medium may be encoded with additional instructions which, when executed by the at least one processor, may further cause the computing system to cause a connection to be established between the client device and a gateway that is in communication with the third application so as to enable the client device to access the third application via the gateway; and to send, by the gateway to the client device, code that causes the first user interface element to be presented based at least in part on the first indicator.

(S15) A computing system may be configured as described in paragraph (S11) or paragraph (S12), and the at least one computer-readable medium may be encoded with additional instructions which, when executed by the at least one processor, may further cause the computing system to determine, by the third application, to present the first user interface element based at least in part on the first indicator.

(S16) A computing system may be configured as described in any of paragraphs (S11) through (S15), wherein the first application may comprise a microapp of a microapp service that is remote from the client device; and the at least one computer-readable medium may be encoded with additional instructions which, when executed by the at least one processor, may further cause the computing system to cause the first application to perform the first action at least in part by sending a first message to the microapp, wherein the first message causes the microapp to perform the first action via an application programming interface (API) of the second application.

The following paragraphs (CRM1) through (CRM16) describe examples of computer-readable media that may be implemented in accordance with the present disclosure.

(CRM1) At least one non-transitory, computer-readable medium may be encoded with instructions which, when executed by at least one processor included in a computing system, cause the computing system to receive, by a first application accessed by a client device, a first indicator of a first action that a second application is configured to take with respect to a third application; to access, by the client device, a fourth application; to present, by the client device and based at least in part on the first indicator received by the first application, at least a first user interface element for the fourth application; detecting, by the client device, selection of the first user interface element; to present, by the client device and based at least in part on selection of the first user interface element, a user interface configured to cause the second application to take the first action with respect to the third application in response to a user input; to detect, by the client device, the user input to the user interface; and to cause, by the client device and based at least in part on the user input, the second application to perform the first action with respect to the third application.

(CRM2) At least one non-transitory, computer-readable medium may be configured as described in paragraph (CRM1), and may be encoded with additional instructions which, when executed by the at least one processor, may further cause the computing system to receive, by the first application, a second indicator that indicates the fourth application can be accessed by the client device; to display, by the client device and based at least in part on the second indicator, a second user interface element corresponding to the fourth application; to detect, by the first application, selection of the second user interface element; and to enable, by the first application, access to the fourth application based at least in part on the selection of the second user interface element.

(CRM3) At least one non-transitory, computer-readable medium may be configured as described in paragraph (CRM2), wherein the fourth application may be remote from the client device, and the at least one computer-readable medium may be encoded with additional instructions which, when executed by the at least one processor, may further cause the computing system to enable access to the fourth application at least in part by configuring a remote access engine of the first application to access the fourth application.

(CRM4) At least one non-transitory, computer-readable medium may be configured as described in paragraph (CRM3), and may be encoded with additional instructions which, when executed by the at least one processor, may further cause the computing system to determine, by the remote access engine, to present the first user interface element based at least in part on the first indicator.

(CRM5) At least one non-transitory, computer-readable medium may be configured as described in paragraph (CRM2), wherein the fourth application may be remote from the client device, and the at least one computer-readable medium may be encoded with additional instructions which, when executed by the at least one processor, may further cause the computing system to enable access to the fourth application at least in part by causing a connection to be established between the client device and a gateway that is in communication with the fourth application so as to enable the client device to access the fourth application via the gateway.

(CRM6) At least one non-transitory, computer-readable medium may be configured as described in paragraph (CRM5), and may be encoded with additional instructions which, when executed by the at least one processor, may further cause the computing system to send, by the gateway to the client device, code that causes the first user interface element to be presented based at least in part on the first indicator.

(CRM7) At least one non-transitory, computer-readable medium may be configured as described in paragraph (CRM2), and may be encoded with additional instructions which, when executed by the at least one processor, may further cause the computing system to enable access to the fourth application at least in part by launching the fourth application.

(CRM8) At least one non-transitory, computer-readable medium may be configured as described in paragraph (CRM7), and may be encoded with additional instructions which, when executed by the at least one processor, may further cause the computing system to determine, by the fourth application, to present the first user interface element based at least in part on the first indicator.

(CRM9) At least one non-transitory, computer-readable medium may be configured as described in any of paragraphs (CRM1) through (CRM8), wherein the second application may comprise a microapp of a microapp service that is remote from the client device, and the at least one computer-readable medium may be encoded with additional instructions which, when executed by the at least one processor, may further cause the computing system to cause the second application to perform the first action at least in part by sending a first message to the microapp, wherein the first message causes the microapp to perform the first action via an application programming interface (API) of the third application.

(CRM10) At least one non-transitory, computer-readable medium may be configured as described in any of paragraphs (CRM1) through (CRM9), and may be encoded with additional instructions which, when executed by the at least one processor, may further cause the computing system to detect selection of information presented by the fourth application; to cause the user interface to include at least a portion of the selected information; and to cause the second application to perform the first action using the portion of the selected information.

(CRM11) At least one non-transitory, computer-readable medium may be encoded with instructions which, when executed by at least one processor included in a computing system, cause the computing system to identify a first indicator of a first action that a first application is configured to take with respect to a second application; to access, by a client device, a third application; to detect selection of information presented by the third application; to present, by the client device and based at least in part on the first indicator, at least a first user interface element for the third application; to detect selection of the first user interface element; to present, by the client device and based at least in part on selection of the first user interface element, a user interface configured to cause the first application to take the first action with respect to the second application in response to a user input, the user interface including at least a portion of the selected information; to detect, by the client device, the user input to the user interface; and to cause, by the client device and based at least in part on the user input, the first application to perform the first action with respect to the second application using the portion of the selected information.

(CRM12) At least one non-transitory, computer-readable medium may be configured as described in paragraph (CRM11), and may be encoded with additional instructions which, when executed by the at least one processor, may further cause the computing system to detect the selection of information at least in part by detecting selection of text output by the third application.

(CRM13) At least one non-transitory, computer-readable medium may be configured as described in paragraph (CRM11) or paragraph (CRM12), wherein the third application may be remote from the client device, and the at least one computer-readable medium may be encoded with additional instructions which, when executed by the at least one processor, may further cause the computing system to configure a remote access engine of the client device to access the third application; and to determine, by the remote access engine, to present the first user interface element based at least in part on the first indicator.

(CRM14) At least one non-transitory, computer-readable medium may be configured as described in paragraph (CRM11) or paragraph (CRM12), wherein the third application may be remote from the client device, and the at least one computer-readable medium may be encoded with additional instructions which, when executed by the at least one processor, may further cause the computing system to cause a connection to be established between the client device and a gateway that is in communication with the third application so as to enable the client device to access the third application via the gateway; and to send, by the gateway to the client device, code that causes the first user interface element to be presented based at least in part on the first indicator.

(CRM15) At least one non-transitory, computer-readable medium may be configured as described in paragraph (CRM11) or paragraph (CRM12), and may be encoded with additional instructions which, when executed by the at least one processor, may further cause the computing system to determine, by the third application, to present the first user interface element based at least in part on the first indicator.

(CRM16) At least one non-transitory, computer-readable medium may be configured as described in any of paragraphs (CRM11) through (CRM15), wherein the first application may comprise a microapp of a microapp service that is remote from the client device, and the at least one computer-readable medium may be encoded with additional instructions which, when executed by the at least one processor, may further cause the computing system to cause the first application to perform the first action at least in part by sending a first message to the microapp, wherein the first message causes the microapp to perform the first action via an application programming interface (API) of the second application.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method, comprising:
sending, from a first application accessed by a client device to a remote computing system, first authentication credentials input to the client device by a first user;
receiving, by the first application and from the remote computing system, a first indicator of a second application that is accessible to the client device based on the remote computing system having authenticated an identity of the first user using the first authentication credentials;
receiving, by the first application and from the remote computing system, a second indicator of an action that a third application executing on the remote computing system is configured to take, based on the remote computing system having authenticated the identity of the first user using the first authentication credentials, with respect to a secure account of the first user that is maintained by a fourth application;
causing, by the first application and based at least in part on the first indicator, the client device to display a first user interface element corresponding to the second application;
detecting, by the first application, selection of the first user interface element;
causing, by the first application, the client device to access to the second application based at least in part on the selection of the first user interface element;
presenting, by the client device and based on the client device accessing the second application, a first user interface that enables user control of the second application;
causing, by the first application and based at least in part on the second indicator, the client device to present a second user interface element within the first user interface;
determining that the first user has selected information displayed via the first user interface;
determining that the second user interface element has been selected while the information displayed via the first user interface is in a selected state;
in response to the selection of the second user interface element, presenting, by the client device, a second user interface for the third application such that the second user interface includes at least a portion of the selected information, the second user interface further including a third user interface element that, when selected, causes the third application to take the action with respect to the secure account maintained by the fourth application using the portion of the selected information; and
in response to detecting selection of the third user interface element, sending, from the client device to the third application, an instruction that triggers the third application to take the action with respect to the secure account maintained by the fourth application by causing, based on the remote computing system having authenticated the identity of the first user using the first authentication credentials, second authentication credentials associated with the first user to be retrieved and used to authenticate to an application programming interface (API) of the fourth application to enable the third application to take the action with respect to the secure account maintained by the fourth application using the portion of the selected information.

2. The method of claim 1, wherein:
the second application is remote from the client device; and
causing the client device to access the second application comprises configuring a remote access engine of the first application to access the second application.

3. The method of claim 2, further comprising:
determining, by the remote access engine, to present the second user interface element within the first user interface based at least in part on the second indicator.

4. The method of claim 1, wherein:
the second application is remote from the client device; and
causing the client device to access the second application comprises causing a connection to be established between the client device and a gateway that is in communication with the second application so as to enable the client device to access the second application via the gateway.

5. The method of claim 4, further comprising:
sending, by the gateway to the client device, code that causes the second user interface element to be presented within the first user interface based at least in part on the second indicator.

6. The method of claim 1, wherein causing the client device to access the second application comprises launching the second application.

7. The method of claim 6, further comprising:
determining, by the second application, to present the second user interface element within the first user interface based at least in part on the second indicator.

8. The method of claim 1, wherein:
the third application comprises a microapp hosted on the remote computing system.

9. The method of claim 1, wherein:
the fourth application is executing on a system of record that is remote from the client device.

10. The method of claim 9, wherein the system of record is remote from the remote computing system.

11. A system, comprising:
at least one processor; and
at least one computer-readable medium encoded with instructions which, when executed by the at least one processor, cause the system to:
send, from a first application accessed by a client device to a remote computing system, first authentication credentials input to the client device by a first user,
receive, by the first application and from the remote computing system, a first indicator of a second application that is accessible to the client device based on the remote computing system having authenticated an identity of the first user using the first authentication credentials,
receive, by the first application and from the remote computing system, a second indicator of an action that a third application executing on the remote computing system is configured to take, based on the remote computing system having authenticated the identity of the first user using the first authentication credentials, with respect to a secure account of the first user that is maintained by a fourth application,
cause, by the first application and based at least in part on the first indicator, the client device to display a first user interface element corresponding to the second application, detect, by the first application, selection of the first user interface element, cause, by the first application, the client device to access to the second application based at least in part on the selection of the first user interface element, present, by the client device and based on the client device accessing the second application, a first user interface that enables user control of the second application, cause, by the first application and based at least in part on the second indicator, the client device to present a second user interface element within the first user interface, determine the first user has selected information displayed via the first user interface, determine that the second user interface element has been selected while the information displayed via the first user interface is in a selected state, in response to the selection of the second user interface element, present, by the client device, a second user interface for the third application such that the second user interface includes at least a portion of the selected information, the second user interface further including a third user interface element that, when selected, causes the third application to take the action with respect to the secure account maintained by the fourth application using the portion of the selected information, and in response to detecting selection of the third user interface element, send, from the client device to the third application, an instruction that triggers the third application to take the action with respect to the secure account maintained by the fourth application by causing, based on the remote computing system having authenticated the identity of the first user using the first authentication credentials, second authentication credentials associated with the first user to be retrieved and used to authenticate to an application programming interface (API) of the fourth application to enable the third application to take the action with respect to the secure account maintained by the fourth application using the portion of the selected information.

12. The system of claim 11, wherein the fourth application is remote from the client device, and the at least one computer-readable medium is further encoded with additional instructions which, when executed by the at least one processor, further cause the system to:

cause the client device to access the second application at least in part by configuring a remote access engine of the first application to access the second application.

13. The system of claim 12, wherein the at least one computer-readable medium is further encoded with additional instructions which, when executed by the at least one processor, further cause the system to:

determine, by the remote access engine, to present the second user interface element within the first user interface based at least in part on the second indicator.

14. The system of claim 11, wherein:

the fourth application resides on a system of record that is remote from the client device.

15. The system of claim 14, wherein the system of record is remote from the remote computing system.

16. The system of claim 11, wherein the second application is remote from the client device, and the at least one computer-readable medium is further encoded with additional instructions which, when executed by the at least one processor, further cause the system to:

cause the client device to access the second application at least in part by causing a connection to be established between the client device and a gateway that is in communication with the second application so as to enable the client device to access the second application via the gateway.

17. The system of claim 16, wherein the at least one computer-readable medium is further encoded with additional instructions which, when executed by the at least one processor, further cause the system to:

send, by the gateway to the client device, code that causes the second user interface element to be presented within the first user interface based at least in part on the second indicator.

18. The system of claim 11, wherein the at least one computer-readable medium is further encoded with additional instructions which, when executed by the at least one processor, further cause the system to:

cause the client device to access the second application at least in part by launching the second application.

19. The system of claim 18, wherein the at least one computer-readable medium is further encoded with additional instructions which, when executed by the at least one processor, further cause the system to:

determine, by the second application, to present the second user interface element within the first user interface based at least in part on the second indicator.

20. The system of claim 11, wherein:

the third application comprises a microapp hosted on the remote computing system.

* * * * *